United States Patent
Li et al.

(10) Patent No.: US 10,973,012 B2
(45) Date of Patent: Apr. 6, 2021

(54) DOWNLINK CONTROL INFORMATION DCI SENDING METHOD AND APPARATUS

(71) Applicant: HUAWEI TECHNOLOGIES CO., LTD., Shenzhen (CN)

(72) Inventors: Chaojun Li, Beijing (CN); Sha Ma, Beijing (CN); Yongxia Lyu, Beijing (CN)

(73) Assignee: HUAWEI TECHNOLOGIES CO, LTD., Shenzhen (CN)

( * ) Notice: Subject to any disclaimer, the term of this patent is extended or adjusted under 35 U.S.C. 154(b) by 125 days.

(21) Appl. No.: 15/959,279

(22) Filed: Apr. 22, 2018

(65) Prior Publication Data
US 2018/0242296 A1    Aug. 23, 2018

Related U.S. Application Data

(63) Continuation of application No. PCT/CN2015/092580, filed on Oct. 22, 2015.

(51) Int. Cl.
*H04W 72/04* (2009.01)
*H04W 72/12* (2009.01)
(Continued)

(52) U.S. Cl.
CPC ......... *H04W 72/042* (2013.01); *H04L 5/0053* (2013.01); *H04L 27/26* (2013.01);
(Continued)

(58) Field of Classification Search
CPC ........... H04W 72/042; H04W 72/0446; H04W 72/0453; H04W 72/12; H04L 5/0053; H04L 27/26; H04L 1/0072
See application file for complete search history.

(56) References Cited

U.S. PATENT DOCUMENTS

2011/0032894 A1    2/2011   Miki et al.
2013/0044727 A1    2/2013   Nory et al.
(Continued)

FOREIGN PATENT DOCUMENTS

CN    101789823 A    7/2010
CN    101826908 A    9/2010
(Continued)

OTHER PUBLICATIONS

"3GPP TS 36.211 V12.7.0 (Sep. 2015), 3rd Generation Partnership Project;Technical Specification Group Radio Access Network;Evolved Universal Terrestrial Radio Access (E-UTRA);Physical channels and modulation(Release 12), Technical Specification, 136 pages".
(Continued)

*Primary Examiner* — Ian N Moore
*Assistant Examiner* — Brian T Le
(74) *Attorney, Agent, or Firm* — Kilpatrick Townsend & Stockton LLP

(57) ABSTRACT

A DCI sending method and an apparatus are provided. A base station determines a first channel resource, where the first channel resource is located in the $i^{th}$ time unit of a subframe in a time domain, the subframe includes $N_T$ time units, $N_T$ is an integer greater than or equal to 2, and i is a positive integer less than or equal to $N_T$; and the base station sends DCI to a terminal device on the first channel resource. In this solution, the first channel resource that carries the DCI is located in the $i^{th}$ time unit of the subframe in the time domain, where i is a positive integer less than or equal to $N_T$. That is, there is a first channel resource in each time unit of the subframe. Therefore, when data needs to be transmitted in any time unit, the data can be transmitted immediately.

22 Claims, 5 Drawing Sheets

A terminal device detects a first channel resource, where the first channel resource is located in the $i^{th}$ time unit of a subframe in a time domain, the subframe includes $N_T$ time units, $N_T$ is an integer greater than or equal to 2, and i is a positive integer less than or equal to $N_T$ — 300

The terminal device decodes downlink control information DCI that is sent by a base station, where the DCI is carried on the first channel resource — 310

(51) Int. Cl.
  *H04L 27/26* (2006.01)
  *H04L 5/00* (2006.01)
  *H04L 1/00* (2006.01)
(52) U.S. Cl.
  CPC ... *H04W 72/0446* (2013.01); *H04W 72/0453* (2013.01); *H04W 72/12* (2013.01); *H04L 1/0072* (2013.01)

(56) References Cited

U.S. PATENT DOCUMENTS

| | | |
|---|---|---|
| 2013/0058282 A1 | 3/2013 | Miki et al. |
| 2013/0064196 A1 | 3/2013 | Gao et al. |
| 2013/0114525 A1 | 5/2013 | Ahmadi |
| 2014/0153539 A1* | 6/2014 | Seo .................. H04L 5/0091 370/330 |
| 2014/0376422 A1 | 12/2014 | Dai et al. |

FOREIGN PATENT DOCUMENTS

| | | |
|---|---|---|
| CN | 102017693 A | 4/2011 |
| CN | 102153978 A | 8/2011 |
| CN | 102625457 A | 8/2012 |
| CN | 102905370 A | 1/2013 |
| CN | 103999397 A | 8/2014 |
| CN | 104025496 A | 9/2014 |
| KR | 20100124783 A | 11/2010 |
| KR | 20130054105 A | 5/2013 |
| KR | 20140048278 A | 4/2014 |
| KR | 20140090253 A | 7/2014 |
| KR | 20150004752 A | 1/2015 |
| WO | 2249598 A1 | 2/2013 |
| WO | 2013022272 A2 | 2/2013 |
| WO | 2013025674 A1 | 2/2013 |

OTHER PUBLICATIONS

"3GPP TS 36.213 V12.7.0 (Sep. 2015), 3rd Generation Partnership Project;Technical Specification Group Radio Access Network;Evolved Universal Terrestrial Radio Access (E-UTRA);Physical layer procedures(Release 12), Technical Specification, 241 pages".
Samsung,"Discussion on ePDCCH Design Issues",3GPP TSG-RAN1#66 meeting R1-112517,Athens, Greece, Aug. 22-26, 2011,total 4 pages.
E.Dahlman et al," 3G Evolution: HSPA and LTE for MobileBroadband", 2nd ed., Elsevier, 2008. [chapter 16.4 Downlink L1/L2 control signaling], total 651 pages.

* cited by examiner

A base station determines a first channel resource, where the first channel resource is located in the $i^{th}$ time unit of a subframe in a time domain, the subframe includes $N_T$ time units, $N_T$ is an integer greater than or equal to 2, and i is a positive integer less than or equal to $N_T$ — 200

The base station sends DCI to a terminal device on the first channel resource — 210

DOWNLINK CONTROL INFORMATION DCI SENDING METHOD AND APPARATUS

CROSS-REFERENCE TO RELATED APPLICATION

This application a continuation of International Patent Application No. PCT/CN2015/092580, filed on Oct. 22, 2015, the disclosure of which is hereby incorporated by reference in its entirety.

TECHNICAL FIELD

The present invention relates to the field of communications technologies, and in particular, to a downlink control information (DCI) sending method and an apparatus.

BACKGROUND

In an Long Term Evolution (LTE) system, before receiving downlink data or sending uplink data, a terminal device needs to know scheduling information that is configured by a base station for the terminal device, such as time-frequency resource allocation and a modulation and coding scheme. In addition, the base station also needs to notify the terminal device of power control command information related to uplink transmission. Such scheduling information and power control command information belong to DCI. At present, the base station mainly adds the DCI to a physical downlink control channel (PDCCH).

An existing transmission time interval (TTI) is duration of a subframe, that is, 1 ms. With evolution of technologies, to reduce a delay, the TTI duration needs to be shortened.

This poses a new requirement on an existing data transmission mechanism.

All currently defined PDCCHs, such as a PDCCH defined in release (Rel)-8 and an enhanced PDCCH (ePDCCH) defined in Rel-11, are used to schedule a data packet with TTI duration being 1 ms. When used for scheduling a data packet with TTI duration less than 1 ms, the currently defined PDCCHs have a problem of a relatively long delay.

For example, in FIG. 1, a PDCCH region is located at the first two symbols in a subframe. When the base station needs to schedule a data packet on the $6^{th}$ symbol of the subframe, the data packet cannot be immediately scheduled in a current subframe by using the PDCCH defined in Rel-8. Instead, the data packet can be scheduled only in a next subframe, that is, after a latency of eight symbols. Therefore, there is a problem of a relatively long delay when a data packet with a TTI less than 1 ms is scheduled.

SUMMARY

Embodiments of the present invention provide a DCI sending method and apparatus, to resolve a problem of a relatively long scheduling delay in the prior art.

According to a first aspect, a downlink control information DCI sending method is provided, including:

determining, by a base station, a first channel resource, where the first channel resource is located in the $i^{th}$ time unit of a subframe in a time domain, the subframe includes $N_T$ time units, $N_T$ is an integer greater than or equal to 2, and i is a positive integer less than or equal to $N_T$; and sending, by the base station, downlink control information DCI to a terminal device on the first channel resource.

With reference to the first aspect, in a first possible implementation, $N_T$ is at least one of 2, 4, 6, 7, 12, or 14.

With reference to the first aspect, or the first possible implementation of the first aspect, in a second possible implementation, when $N_T=2$, two time units included in the subframe are a first time unit and a second time unit, the first time unit is located in the $1^{st}$ slot of the subframe, and the second time unit is located in the $2^{nd}$ slot of the subframe; or when $N_T=4$, four time units included in the subframe are a first time unit, a second time unit, a third time unit, and a fourth time unit, the first time unit is located in a first symbol set {#0, #1, #2, #3}, the second time unit is located in a second symbol set {#4, #5, #6}, the third time unit is located in a third symbol set {#7, #8, #9, #10}, and the fourth time unit is located in a fourth symbol set {#11, #12, #13}.

With reference to the first aspect, or the first or the second possible implementation of the first aspect, in a third possible implementation, before the determining, by a base station, a first channel resource, the method further includes:

determining, by the base station, that an aggregation level AL is L within duration T, where L is a positive integer; or determining, by the base station, that an AL is L, and sending signaling to the terminal device, where the signaling is used to indicate that an AL of the first channel resource is L, and L is a positive integer.

With reference to the first aspect, or any one of the first to the third possible implementations of the first aspect, in a fourth possible implementation, the determining, by a base station, a first channel resource includes:

determining, by the base station, M candidate channel resources, where an AL of each of the M candidate channel resources is L, and M is a positive integer; and selecting, by the base station, a candidate channel resource from the M candidate channel resources as the first channel resource.

With reference to the fourth possible implementation of the first aspect, in a fifth possible implementation, the selecting, by the base station, a candidate channel resource from the M candidate channel resources as the first channel resource includes:

selecting, by the base station according to an identifier of the terminal device, the candidate channel resource from the M candidate channel resources as the first channel resource.

With reference to the fourth or the fifth possible implementation of the first aspect, in a sixth possible implementation, if $N_T$ is equal to 2, and L is equal to 1 or 2, M is equal to 3;

if $N_T$ is equal to 2, and L is equal to 4 or 8, M is equal to 1;

if $N_T$ is equal to 4, 6, 7, 12, or 14, and L is equal to 1 or 2, M is equal to 1 or 2; and if $N_T$ is equal to 4, 6, 7, 12, or 14, and L is equal to 4 or 8, M is equal to 1.

With reference to the first aspect, or any one of the first to the sixth possible implementations of the first aspect, in a seventh possible implementation, the DCI includes information used to indicate a transmission resource; and after the sending, by the base station, DCI to a terminal device on the first channel resource, the method further includes:

performing, by the base station, data transmission with the terminal device on the transmission resource.

With reference to the seventh possible implementation of the first aspect, in an eighth possible implementation, the transmission resource is unavailable to carry DCI of another terminal device.

With reference to the first aspect, or any one of the first to the eighth possible implementations of the first aspect, in a ninth possible implementation, the $i^{th}$ time unit includes at least one data symbol, and the first channel resource is located at a data symbol in the $i^{th}$ time unit in the time domain.

With reference to the first aspect, or any one of the first to the eighth possible implementations of the first aspect, in a tenth possible implementation, when the $i^{th}$ time unit includes a PDCCH symbol, the first channel resource is located at the PDCCH symbol in the $i^{th}$ time unit in the time domain; or when the $i^{th}$ time unit does not include a PDCCH symbol, and includes at least one data symbol, the first channel resource is located at a data symbol in the $i^{th}$ time unit in the time domain.

With reference to the ninth or the tenth possible implementation of the first aspect, in an eleventh possible implementation, when the first channel resource is located at the data symbol in the $i^{th}$ time unit in the time domain, the first channel resource includes X RUs, and any one of the X RUs occupies one symbol in the time domain, and occupies $N_{sc}^{RB}$ subcarriers in a frequency domain, where X is a positive integer.

With reference to the eleventh possible implementation of the first aspect, in a twelfth possible implementation, if Y is greater than or equal to X, the first channel resource is located at the $1^{st}$ data symbol in the $i^{th}$ time unit in the time domain, and occupies the X RUs in the frequency domain, where Y is a quantity of RUs occupied by an available bandwidth in the frequency domain;

if Y is less than X, the first channel resource is located at the first N data symbols in the $i^{th}$ time unit in the time domain; and for each of the N data symbols, the first channel resource occupies $$\frac{X}{N}$$

RUs in the frequency domain, where N is less than or equal to a total quantity of data symbols included in the $i^{th}$ time unit; and if Y is less than X, the first channel resource is located at the first N data symbols in the $i^{th}$ time unit in the time domain; and for the first N-1 data symbols of the N data symbols, the first channel resource occupies W RUs in the frequency domain, and for the $N^{th}$ data symbol of the N data symbols, the first channel resource occupies X−W*(N-1) RUs in the frequency domain, where N is less than or equal to a total quantity of data symbols included in the $i^{th}$ time unit, W is less than or equal to Y, and X−W*(N-1) is less than or equal to Y.

With reference to the first aspect, or any one of the first to the twelfth possible implementations of the first aspect, in a thirteenth possible implementation, when the first channel resource is located at the data symbol in the $i^{th}$ time unit in the time domain, the first channel resource is a localized channel resource or a distributed channel resource.

With reference to the thirteenth possible implementation of the first aspect, in a fourteenth possible implementation, the DCI includes the information used to indicate the transmission resource;

if the first channel resource is the localized channel resource, the transmission resource occupies at least one localized enhanced resource block group LERBG in the frequency domain; and if the first channel resource is the distributed channel resource, the transmission resource occupies at least one distributed enhanced resource block group DERBG in the frequency domain.

With reference to any one of the second to the seventh possible implementations of the first aspect, in a fifteenth possible implementation, if $N_T$=2, and the $i^{th}$ time unit is the first time unit, the first channel resource is a PDCCH in a first control region, and the first control region is located at the first $N_{sym1}$ symbols in the $1^{st}$ slot; and if $N_T$=2, and the $i^{th}$ time unit is the second time unit, the first channel resource is a PDCCH in a second control region, and the second control region is located at the first $N_{sym2}$ symbols in the $2^{nd}$ slot, where $N_{sym1}$ is 1, 2, 3, or 4, $N_{sym2}$ is a positive integer, and a quantity of frequency domain resources occupied by the second control region is less than or equal to a quantity of frequency domain resources occupied by the first control region.

With reference to the fifteenth possible implementation of the first aspect, in a sixteenth possible implementation, before the determining, by a base station, a first channel resource, the method further includes:

sending, by the base station to the terminal device, signaling indicating a value of $N_{sym2}$, where the signaling is a control format indicator CFI carried on a physical control format indicator channel PCFICH in the $1^{st}$ slot, or a CFI carried on a PCFICH in the $2^{nd}$ slot, or higher layer signaling.

According to a second aspect, a downlink control information DCI receiving method is provided, including:

detecting, by a terminal device, a first channel resource, where the first channel resource is located in the $i^{th}$ time unit of a subframe in a time domain, the subframe includes $N_T$ time units, $N_T$ is an integer greater than or equal to 2, and i is a positive integer less than or equal to $N_T$; and decoding, by the terminal device, downlink control information DCI that is sent by a base station, where the DCI is carried on the first channel resource.

With reference to the second aspect, in a first possible implementation, $N_T$ is at least one of 2, 4, 6, 7, 12, or 14.

With reference to the second aspect, or the first possible implementation of the second aspect, in a second possible implementation, when $N_T$=2, two time units included in the subframe are a first time unit and a second time unit, the first time unit is located in the $1^{st}$ slot of the subframe, and the second time unit is located in the $2^{nd}$ slot of the subframe; or when $N_T$=4, four time units included in the subframe are a first time unit, a second time unit, a third time unit, and a fourth time unit, the first time unit is located in a first symbol set {#0, #1, #2, #3}, the second time unit is located in a second symbol set {#4, #5, #6}, the third time unit is located in a third symbol set {#7, #8, #9, #10}, and the fourth time unit is located in a fourth symbol set {#11, #12, #13}.

With reference to the second aspect, or the first or the second possible implementation of the second aspect, in a third possible implementation, before the detecting, by a terminal device, a first channel resource, the method further includes:

determining, by the terminal device, that an aggregation level AL is L within duration T, where L is a positive integer; or receiving, by the terminal device, signaling sent by the base station, and determining, according to the signaling, that an AL is L, where the signaling is used to indicate that an AL of the first channel resource is L, and L is a positive integer.

With reference to the second aspect, or any one of the first to the third possible implementations of the second aspect, in a fourth possible implementation, the detecting, by a terminal device, a first channel resource includes:

determining, by the terminal device, M candidate channel resources, where an AL of each of the M candidate channel resources is L, and M is a positive integer; and finding, by the terminal device, a candidate channel resource from the M candidate channel resources as the first channel resource.

With reference to the second aspect, or any one of the first to the third possible implementations of the second aspect, in a fifth possible implementation, the finding, by the terminal device, a candidate channel resource from the M candidate channel resources as the first channel resource includes:

finding, by the terminal device according to an identifier of the terminal device, the candidate channel resource from the M candidate channel resources as the first channel resource.

With reference to the fourth or the fifth possible implementation of the second aspect, in a sixth possible implementation, if $N_T$ is equal to 2, and L is equal to 1 or 2, M is equal to 3;

if $N_T$ is equal to 2, and L is equal to 4 or 8, M is equal to 1;

if $N_T$ is equal to 4, 6, 7, 12, or 14, and L is equal to 1 or 2, M is equal to 1 or 2; and if $N_T$ is equal to 4, 6, 7, 12, or 14, and L is equal to 4 or 8, M is equal to 1.

With reference to the second aspect, or any one of the first to the sixth possible implementations of the second aspect, in a seventh possible implementation, the DCI includes information used to indicate a transmission resource; and after the decoding, by the terminal device, DCI that is sent by a base station, the method further includes:

performing, by the terminal device, data transmission with the base station on the transmission resource.

With reference to the seventh possible implementation of the second aspect, in an eighth possible implementation, the transmission resource is unavailable to carry DCI of another terminal device.

With reference to the second aspect, or any one of the first to the eighth possible implementations of the second aspect, in a ninth possible implementation, the $i^{th}$ time unit includes at least one data symbol, and the first channel resource is located at a data symbol in the $i^{th}$ time unit in the time domain.

With reference to the second aspect, or any one of the first to the eighth possible implementations of the second aspect, in a tenth possible implementation, when the $i^{th}$ time unit includes a PDCCH symbol, the first channel resource is located at the PDCCH symbol in the $i^{th}$ time unit in the time domain; or when the $i^{th}$ time unit does not include a PDCCH symbol, and includes at least one data symbol, the first channel resource is located at a data symbol in the $i^{th}$ time unit in the time domain.

With reference to the ninth or the tenth possible implementation of the second aspect, in an eleventh possible implementation, when the first channel resource is located at the data symbol in the $i^{th}$ time unit in the time domain, the first channel resource includes X RUs, and any one of the X RUs occupies one symbol in the time domain, and occupies $N_{sc}^{RB}$ subcarriers in a frequency domain, where X is a positive integer.

With reference to the eleventh possible implementation of the second aspect, in a twelfth possible implementation, if Y is greater than or equal to X, the first channel resource is located at the $1^{st}$ data symbol in the $i^{th}$ time unit in the time domain, and occupies the X RUs in the frequency domain, where Y is a quantity of RUs occupied by an available bandwidth in the frequency domain;

if Y is less than X, the first channel resource is located at the first N data symbols in the $i^{th}$ time unit in the time domain; and for each of the N data symbols, the first channel resource occupies $$\frac{X}{N}$$

RUs in the frequency domain, where N is less than or equal to a total quantity of data symbols included in the $i^{th}$ time unit; and if Y is less than X, the first channel resource is located at the first N data symbols in the $i^{th}$ time unit in the time domain; and for the first N-1 data symbols of the N data symbols, the first channel resource occupies W RUs in the frequency domain, and for the $N^{th}$ data symbol of the N data symbols, the first channel resource occupies X−W*(N-1) RUs in the frequency domain, where N is less than or equal to a total quantity of data symbols included in the $i^{th}$ time unit, W is less than or equal to Y, and X−W*(N-1) is less than or equal to Y.

With reference to the second aspect, or any one of the first to the twelfth possible implementations of the second aspect, in a thirteenth possible implementation, when the first channel resource is located at the data symbol in the $i^{th}$ time unit in the time domain, the first channel resource is a localized channel resource or a distributed channel resource.

With reference to the thirteenth possible implementation of the second aspect, in a fourteenth possible implementation, the DCI includes the information used to indicate the transmission resource;

if the first channel resource is the localized channel resource, the transmission resource occupies at least one localized enhanced resource block group LERBG in the frequency domain; and if the first channel resource is the distributed channel resource, the transmission resource occupies at least one distributed enhanced resource block group DERBG in the frequency domain.

With reference to any one of the second to the seventh possible implementations of the second aspect, in a fifteenth possible implementation, if $N_T$=2, and the $i^{th}$ time unit is the first time unit, the first channel resource is a PDCCH in a first control region, and the first control region is located at the first $N_{sym1}$ symbols in the $1^{st}$ slot; and if $N_T$=2, and the $i^{th}$ time unit is the second time unit, the first channel resource is a PDCCH in a second control region, and the second control region is located at the first $N_{sym2}$ symbols in the $2^{nd}$ slot, where $N_{sym1}$ is 1, 2, 3, or 4, $N_{sym2}$ is a positive integer, and a quantity of frequency domain resources occupied by the second control region is less than or equal to a quantity of frequency domain resources occupied by the first control region.

With reference to the fifteenth possible implementation of the second aspect, in a sixteenth possible implementation, before the detecting, by a terminal device, a first channel resource, the method further includes:

receiving, by the terminal device, signaling that is used to indicate a value of $N_{sym2}$ and that is sent by the base station, where the signaling is a control format indicator CFI carried on a physical control format indicator channel PCFICH in the $1^{st}$ slot, or a CFI carried on a PCFICH in the $2^{nd}$ slot, or higher layer signaling.

According to a third aspect, a base station is provided, including:

a processing unit, configured to determine a first channel resource, where the first channel resource is located in the $i^{th}$ time unit of a subframe in a time domain, the subframe includes $N_T$ time units, $N_T$ is an integer greater than or equal to 2, and i is a positive integer less than or equal to $N_T$; and a sending unit, configured to send downlink control information DCI to a terminal device on the first channel resource.

With reference to the third aspect, in a first possible implementation, $N_T$ is at least one of 2, 4, 6, 7, 12, or 14.

With reference to the third aspect, or the first possible implementation of the third aspect, in a second possible implementation, when $N_T=2$, 2 time units included in the subframe are a first time unit and a second time unit, the first time unit is located in the $1^{st}$ slot of the subframe, and the second time unit is located in the $2^{nd}$ slot of the subframe; or when $N_T=4$, four time units included in the subframe are a first time unit, a second time unit, a third time unit, and a fourth time unit, the first time unit is located in a first symbol set {#0, #1, #2, #3}, the second time unit is located in a second symbol set {#4, #5, #6}, the third time unit is located in a third symbol set {#7, #8, #9, #10}, and the fourth time unit is located in a fourth symbol set {#11, #12, #13}.

With reference to the third aspect, or the first or the second possible implementation of the third aspect, in a third possible implementation, the processing unit is further configured to: determine that an aggregation level AL is L within duration T, where L is a positive integer; or determine that an AL is L, and send signaling to the terminal device, where the signaling is used to indicate that an AL of the first channel resource is L, and L is a positive integer.

With reference to the third aspect, or any one of the first to the third possible implementations of the third aspect, in a fourth possible implementation, that the processing unit determines a first channel resource, comprises:

determining M candidate channel resources, where an AL of each of the M candidate channel resources is L, and M is a positive integer; and selecting a candidate channel resource from the M candidate channel resources as the first channel resource.

With reference to the fourth possible implementation of the third aspect, in a fifth possible implementation, that the processing unit selects a candidate channel resource from the M candidate channel resources as the first channel resource, comprises:

selecting, according to an identifier of the terminal device, the candidate channel resource from the M candidate channel resources as the first channel resource.

With reference to the fourth or the fifth possible implementation of the third aspect, in a sixth possible implementation, if $N_T$ is equal to 2, and L is equal to 1 or 2, M is equal to 3;

if $N_T$ is equal to 2, and L is equal to 4 or 8, M is equal to 1;

if $N_T$ is equal to 4, 6, 7, 12, or 14, and L is equal to 1 or 2, M is equal to 1 or 2; and if $N_T$ is equal to 4, 6, 7, 12, or 14, and L is equal to 4 or 8, M is equal to 1.

With reference to the third aspect, or any one of the first to the sixth possible implementations of the third aspect, in a seventh possible implementation, the DCI includes information used to indicate a transmission resource; and the sending unit is further configured to perform data transmission with the terminal device on the transmission resource.

With reference to the seventh possible implementation of the third aspect, in an eighth possible implementation, the transmission resource is unavailable to carry DCI of another terminal device.

With reference to the third aspect, or any one of the first to the eighth possible implementations of the third aspect, in a ninth possible implementation, the $i^{th}$ time unit includes at least one data symbol, and the first channel resource is located at a data symbol in the $i^{th}$ time unit in the time domain.

With reference to the third aspect, or any one of the first to the eighth possible implementations of the third aspect, in a tenth possible implementation, when the $i^{th}$ time unit includes a PDCCH symbol, the first channel resource is located at the PDCCH symbol in the $i^{th}$ time unit in the time domain; or when the $i^{th}$ time unit does not include a PDCCH symbol, and includes at least one data symbol, the first channel resource is located at a data symbol in the $i^{th}$ time unit in the time domain.

With reference to the ninth or the tenth possible implementation of the third aspect, in an eleventh possible implementation, when the first channel resource is located at the data symbol in the $i^{th}$ time unit in the time domain, the first channel resource includes X RUs, and any one of the X RUs occupies one symbol in the time domain, and occupies $N_{sc}^{RB}$ subcarriers in a frequency domain, where X is a positive integer.

With reference to the eleventh possible implementation of the third aspect, in a twelfth possible implementation, if Y is greater than or equal to X, the first channel resource is located at the $1^{st}$ data symbol in the $i^{th}$ time unit in the time domain, and occupies the X RUs in the frequency domain, where Y is a quantity of RUs occupied by an available bandwidth in the frequency domain;

if Y is less than X, the first channel resource is located at the first N data symbols in the $i^{th}$ time unit in the time domain; and for each of the N data symbols, the first channel resource occupies $$\frac{X}{N}$$

RUs in the frequency domain, where N is less than or equal to a total quantity of data symbols included in the $i^{th}$ time unit; and if Y is less than X, the first channel resource is located at the first N data symbols in the $i^{th}$ time unit in the time domain; and for the first N-1 data symbols of the N data symbols, the first channel resource occupies W RUs in the frequency domain, and for the $N^{th}$ data symbol of the N data symbols, the first channel resource occupies X−W*(N-1) RUs in the frequency domain, where N is less than or equal to a total quantity of data symbols included in the $i^{th}$ time unit, W is less than or equal to Y, and X−W*(N-1) is less than or equal to Y.

With reference to the third aspect, or any one of the first to the twelfth possible implementations of the third aspect, in a thirteenth possible implementation, when the first channel resource is located at the data symbol in the $i^{th}$ time unit in the time domain, the first channel resource is a localized channel resource or a distributed channel resource.

With reference to the thirteenth possible implementation of the third aspect, in a fourteenth possible implementation, the DCI includes the information used to indicate the transmission resource;

if the first channel resource is the localized channel resource, the transmission resource occupies at least one localized enhanced resource block group LERBG in the frequency domain; and if the first channel resource is the distributed channel resource, the transmission resource occupies at least one distributed enhanced resource block group DERBG in the frequency domain.

With reference to any one of the second to the seventh possible implementations of the third aspect, in a fifteenth possible implementation, if $N_T=2$, and the $i^{th}$ time unit is the first time unit, the first channel resource is a PDCCH in a first control region, and the first control region is located at the first $N_{sym1}$ symbols in the $1^{st}$ slot; and if $N_T=2$, and the $i^{th}$ time unit is the second time unit, the first channel resource is a PDCCH in a second control region, and the second control region is located at the first symbols in the $2^{nd}$ slot, where $N_{sym1}$ is 1, 2, 3, or 4, $N_{sym2}$ is a positive integer, and a quantity of frequency domain resources occupied by the second control region is less than or equal to a quantity of frequency domain resources occupied by the first control region.

With reference to the fifteenth possible implementation of the third aspect, in a sixteenth possible implementation, the sending unit is further configured to send, to the terminal device, signaling indicating a value of $N_{sym2}$, where the signaling is a control format indicator CFI carried on a physical control format indicator channel PCFICH in the $1^{st}$ slot, or a CFI carried on a PCFICH in the $2^{nd}$ slot, or higher layer signaling.

According to a fourth aspect, a terminal device is provided, including:

a processing unit, configured to detect a first channel resource, where the first channel resource is located in the $i^{th}$ time unit of a subframe in a time domain, the subframe includes $N_T$ time units, $N_T$ is an integer greater than or equal to 2, and i is a positive integer less than or equal to $N_T$; and a sending unit, configured to decode downlink control information DCI that is sent by a base station, where the DCI is carried on the first channel resource.

With reference to the fourth aspect, in a first possible implementation, $N_T$ is at least one of 2, 4, 6, 7, 12, or 14.

With reference to the fourth aspect, or the first possible implementation of the fourth aspect, in a second possible implementation, when $N_T=2$, two time units included in the subframe are a first time unit and a second time unit, the first time unit is located in the $1^{st}$ slot of the subframe, and the second time unit is located in the $2^{nd}$ slot of the subframe; or when $N_T=4$, four time units included in the subframe are a first time unit, a second time unit, a third time unit, and a fourth time unit, the first time unit is located in a first symbol set {#0, #1, #2, #3}, the second time unit is located in a second symbol set {#4, #5, #6}, the third time unit is located in a third symbol set {#7, #8, #9, #10}, and the fourth time unit is located in a fourth symbol set {#11, #12, #13}.

With reference to the fourth aspect, or the first or the second possible implementation of the fourth aspect, in a third possible implementation, the processing unit is further configured to determine that an aggregation level AL is L within duration T, where L is a positive integer; or the terminal device further includes a receiving unit, configured to receive signaling sent by the base station, where the processing unit is further configured to determine, according to the signaling received by the receiving unit, that an AL is L, where the signaling is used to indicate that an AL of the first channel resource is L, and L is a positive integer.

With reference to the fourth aspect, or any one of the first to the third possible implementations of the fourth aspect, in a fourth possible implementation, that the processing unit detects a first channel resource, comprises:

determining M candidate channel resources, where an AL of each of the M candidate channel resources is L, and M is a positive integer; and finding a candidate channel resource from the M candidate channel resources as the first channel resource.

With reference to the fourth aspect, or any one of the first to the third possible implementations of the fourth aspect, in a fifth possible implementation, that the processing unit finds a candidate channel resource from the M candidate channel resources as the first channel resource, comprises:

finding, according to an identifier of the terminal device, the candidate channel resource from the M candidate channel resources as the first channel resource.

With reference to the fourth or the fifth possible implementation of the fourth aspect, in a sixth possible implementation, if $N_T$ is equal to 2, and L is equal to 1 or 2, M is equal to 3;

if $N_T$ is equal to 2, and L is equal to 4 or 8, M is equal to 1;

if $N_T$ is equal to 4, 6, 7, 12, or 14, and L is equal to 1 or 2, M is equal to 1 or 2; and if $N_T$ is equal to 4, 6, 7, 12, or 14, and L is equal to 4 or 8, M is equal to 1.

With reference to the fourth aspect, or any one of the first to the sixth possible implementations of the fourth aspect, in a seventh possible implementation, the DCI includes information used to indicate a transmission resource; and the sending unit is further configured to perform data transmission with the base station on the transmission resource.

With reference to the seventh possible implementation of the fourth aspect, in an eighth possible implementation, the transmission resource is unavailable to carry DCI of another terminal device.

With reference to the fourth aspect, or any one of the first to the eighth possible implementations of the fourth aspect, in a ninth possible implementation, the $i^{th}$ time unit includes at least one data symbol, and the first channel resource is located at a data symbol in the $i^{th}$ time unit in the time domain.

With reference to the fourth aspect, or any one of the first to the eighth possible implementations of the fourth aspect, in a tenth possible implementation, when the $i^{th}$ time unit includes a PDCCH symbol, the first channel resource is located at the PDCCH symbol in the $i^{th}$ time unit in the time domain; or when the $i^{th}$ time unit does not include a PDCCH symbol, and includes at least one data symbol, the first channel resource is located at a data symbol in the $i^{th}$ time unit in the time domain.

With reference to the ninth or the tenth possible implementation of the fourth aspect, in an eleventh possible implementation, when the first channel resource is located at the data symbol in the $i^{th}$ time unit in the time domain, the first channel resource includes X RUs, and any one of the X RUs occupies one symbol in the time domain, and occupies $N_{sc}^{RB}$ subcarriers in a frequency domain, where X is a positive integer.

With reference to the eleventh possible implementation of the fourth aspect, in a twelfth possible implementation, if Y is greater than or equal to X, the first channel resource is located at the $1^{st}$ data symbol in the $i^{th}$ time unit in the time domain, and occupies the X RUs in the frequency domain, where Y is a quantity of RUs occupied by an available bandwidth in the frequency domain;

if Y is less than X, the first channel resource is located at the first N data symbols in the $i^{th}$ time unit in the time domain; and for each of the N data symbols, the first channel resource occupies $$\frac{X}{N}$$

RUs in the frequency domain, where N is less than or equal to a total quantity of data symbols included in the $i^{th}$ time unit; and if Y is less than X, the first channel resource is located at the first N data symbols in the $i^{th}$ time unit in the time domain; and for the first N-1 data symbols of the N data symbols, the first channel resource occupies W RUs in the frequency domain, and for the $N^{th}$ data symbol of the N data symbols, the first channel resource occupies X−W*(N−1) RUs in the frequency domain, where N is less than or equal to a total quantity of data symbols included in the $i^{th}$ time unit, W is less than or equal to Y, and X−W*(N−1) is less than or equal to Y.

With reference to the fourth aspect, or any one of the first to the twelfth possible implementations of the fourth aspect, in a thirteenth possible implementation, when the first channel resource is located at the data symbol in the $i^{th}$ time unit in the time domain, the first channel resource is a localized channel resource or a distributed channel resource.

With reference to the thirteenth possible implementation of the fourth aspect, in a fourteenth possible implementation, the DCI includes the information used to indicate the transmission resource;

if the first channel resource is the localized channel resource, the transmission resource occupies at least one localized enhanced resource block group LERBG in the frequency domain; and if the first channel resource is the distributed channel resource, the transmission resource occupies at least one distributed enhanced resource block group DERBG in the frequency domain.

With reference to any one of the second to the seventh possible implementations of the fourth aspect, in a fifteenth possible implementation, if $N_T$=2, and the $i^{th}$ time unit is the first time unit, the first channel resource is a PDCCH in a first control region, and the first control region is located at the first $N_{sym1}$ symbols in the $1^{st}$ slot; and if $N_T$=2, and the $i^{th}$ time unit is the second time unit, the first channel resource is a PDCCH in a second control region, and the second control region is located at the first $N_{sym2}$ symbols in the $2^{nd}$ slot, where $N_{sym1}$ is 1, 2, 3, or 4, $N_{sym2}$ is a positive integer, and a quantity of frequency domain resources occupied by the second control region is less than or equal to a quantity of frequency domain resources occupied by the first control region.

With reference to the fifteenth possible implementation of the fourth aspect, in a sixteenth possible implementation, the terminal device further includes a receiving unit, configured to receive signaling that is used to indicate a value of $N_{sym2}$ and that is sent by the base station, where the signaling is a control format indicator CFI carried on a physical control format indicator channel PCFICH in the $1^{st}$ slot, or a CFI carried on a PCFICH in the $2^{nd}$ slot, or higher layer signaling.

In the embodiments of the present invention, a DCI sending method is provided. The method includes: determining, by a base station, a first channel resource, where the first channel resource is located in the $i^{th}$ time unit of a subframe in a time domain, the subframe includes $N_T$ time units, $N_T$ is an integer greater than or equal to 2, and i is a positive integer less than or equal to $N_T$; and sending, by the base station, DCI to a terminal device on the first channel resource. In this solution, the first channel resource that carries the DCI is located in the $i^{th}$ time unit of the subframe in the time domain, where i is a positive integer less than or equal to $N_T$. That is, there is a first channel resource in each time unit of the subframe. Therefore, when data needs to be transmitted in any time unit, the data can be transmitted immediately, instead of waiting until a next subframe. This reduces a scheduling delay.

For example, a subframe includes seven time units, a time unit includes two symbols, data needs to be transmitted on the $6^{th}$ symbol, and the $6^{th}$ symbol is located in the $3^{rd}$ time unit. There is a first channel resource in the $3^{rd}$ time unit, and therefore, uplink data transmission scheduling can be performed at the $6^{th}$ symbol, and then the terminal device sends uplink data, instead of waiting to perform uplink data transmission scheduling in a next subframe. Therefore, a problem of a relatively long scheduling delay in the prior art is resolved.

DESCRIPTION OF EMBODIMENTS

Figures 1, 2A:
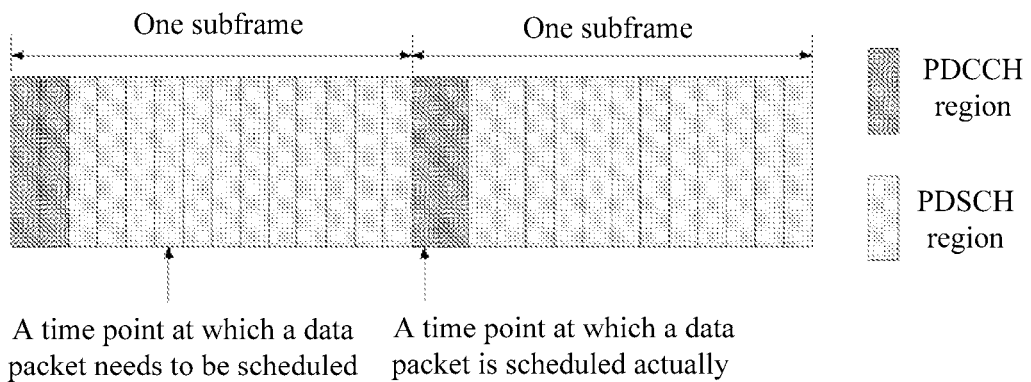
FIG. 1 is a schematic diagram of data scheduling in the prior art.
FIG. 2A is a flowchart for sending DCI according to an embodiment of the present invention.

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

For easy understanding of the embodiments of the present invention, the following describes basic concepts used in the embodiments of the present invention.

(1) Frame Structure

A radio frame (frame) in the embodiments of the present invention includes 10 subframes (subframe), a length of each subframe is 1 millisecond (ms), each subframe includes two timeslots (slot), and each slot is 0.5 ms.

A quantity of symbols included in each slot is related to a cyclic prefix (CP) length in a subframe. If a CP is a normal CP, each slot includes seven symbols; if the CP is an extended CP, each slot includes six symbols. That is, when the normal CP is set for a subframe, each subframe is composed of 14 symbols, that is, each subframe is composed of symbols with sequence numbers #0, #1, #2, #3, #4, #5, #6, #7, #8, #9, #10, #11, #12, and #13. When the extended CP is set for a subframe, each subframe is composed of 12 symbols, that is, each subframe is composed of symbols with sequence numbers #0, #1, #2, #3, #4, #5, #6, #7, #8, #9, #10, and #11.

Symbols included in each slot may include an uplink symbol and a downlink symbol. The uplink symbol is referred to as an single carrier frequency division multiple access (SC-FDMA) symbol. The downlink symbol is referred to as an orthogonal frequency division multiplexing (OFDM) symbol. It should be noted that, if an uplink multiple access manner of orthogonal frequency division multiple access (OFDMA) is introduced in a subsequent technology, the uplink symbol may also be referred to as an OFDM symbol. In the embodiments of the present invention, forms of the uplink symbol and the downlink symbol are not specifically limited.

(2) PDCCH and Search Space

A PDCCH described in the embodiments of the present invention may be a PDCCH defined in release (Rel)-8, an ePDCCH defined in Rel-11, and a future evolved PDCCH.

Certainly, with development of science and technologies, a channel that carries DCI is not limited to the PDCCH, and any channel that can be used to send DCI to a terminal device can be used.

A search space includes one or more PDCCHs, and each PDCCH is a PDCCH candidate and can be used to carry DCI. In brief, the search space is a set of PDCCH candidates. The terminal device needs to monitor each PDCCH candidate, and therefore, the search space is also a set of PDCCHs monitored by the terminal device. A search space constituted by PDCCHs defined in Rel-8 is referred to as a PDCCH search space, and a search space constituted by ePDCCHs defined in Rel-11 is referred to as an ePDCCH search space.

There are two types of search spaces: a common search space (CSS) and a UE-specific search space (UESS). The CSS is a search space that needs to be monitored by multiple terminal devices in a cell, and the UESS is a search space that needs to be monitored by a specific terminal device in a cell.

Correspondingly, a PDCCH UESS is a UESS constituted by PDCCHs defined in Rel-8, and an ePDCCH UESS is a UESS constituted by ePDCCHs defined in Rel-11.

(3) Aggregation Level

In the embodiments of the present invention, a PDCCH that is used to send scheduling information includes L aggregated control channel elements (CCEs), where L is a positive integer and is referred to as an aggregation level (AL). For example, for the PDCCH defined in Rel-8, L may be 1, 2, 4, or 8. For another example, for the ePDCCH defined in Rel-11, L may be 1, 2, 4, 8, 16, or 32.

In addition, in the present invention, a first channel resource that is located at a data symbol and that is used to carry DCI includes L aggregated data-symbol control information elements (DsCCEs), where L is a positive integer and is referred to as an AL.

(4) Data Transmission Mode

In the embodiments of the present invention, the data transmission mode includes a data transmission mode in which a normal TTI is used and a data transmission mode in which a short TTI is used. After configuring the data transmission mode, a base station may send, to the terminal device, signaling indicating the data transmission mode. The signaling is higher layer signaling or physical layer signaling. After receiving the signaling, the terminal device determines the data transmission mode.

The normal TTI means that a length of the TTI is one subframe or 1 ms. A data packet that is transmitted by using the normal TTI is referred to as a "normal TTI data packet". Optionally, a time domain resource occupied by the normal TTI data packet may be not a complete subframe or 1 ms.

For example, the first one, two, three, or four symbols in a downlink subframe may be used to transmit a PDCCH. Therefore, a time domain resource that is occupied by a normal downlink TTI data packet may be not a complete subframe.

For another example, the last symbol in an uplink subframe may be used to transmit an sounding reference signal (SRS). Therefore, a time domain resource that is occupied by a normal uplink TTI data packet may be not a complete subframe, either.

The short TTI means that a length of the TTI is less than one subframe or 1 ms. A data packet that is transmitted by using the short TTI is referred to as a "short TTI data packet".

The following describes preferred implementations of the present invention in detail with reference to the accompanying drawings. It should be understood that the preferred embodiments described herein are merely used to illustrate and explain the present invention, but are not intended to limit the present invention. In addition, the embodiments of this application and features in the embodiments may be mutually combined when the embodiments do not conflict with each other.

The following describes the embodiments of the present invention in detail with reference to the accompanying drawings.

Embodiment 1

As shown in FIG. 2A, in this embodiment of the present invention, a procedure for sending DCI is as follows:

Step 200: A base station determines a first channel resource, where the first channel resource is located in the $i^{th}$ time unit of a subframe in a time domain, the subframe includes $N_T$ time units, $N_T$ is an integer greater than or equal to 2, and i is a positive integer less than or equal to $N_T$.

Step 210: The base station sends DCI to a terminal device on the first channel resource.

In this embodiment of the present invention, the subframe may be replaced with 1 ms. Therefore, step 200 may be described as follows:

A base station determines a first channel resource, where the first channel resource is located in the $i^{th}$ time unit of 1 ms in a time domain, 1 ms includes $N_T$ time units, $N_T$ is an integer greater than or equal to 2, and i is a positive integer less than or equal to $N_T$.

In this embodiment of the present invention, optionally, $N_T$ is at least one of 2, 4, 6, 7, 12, or 14.

Optionally, for a normal CP, $N_T$ is 2, 4, 7, or 14; for an extended CP, $N_T$ is 2, 4, 6, or 12.

It should be noted that, a time length of a subframe or 1 ms may be equal to a total time length of the $N_T$ time units. Alternatively, a time length of a subframe or 1 ms may be greater than a total time length of the $N_T$ time units.

Figure 2B:
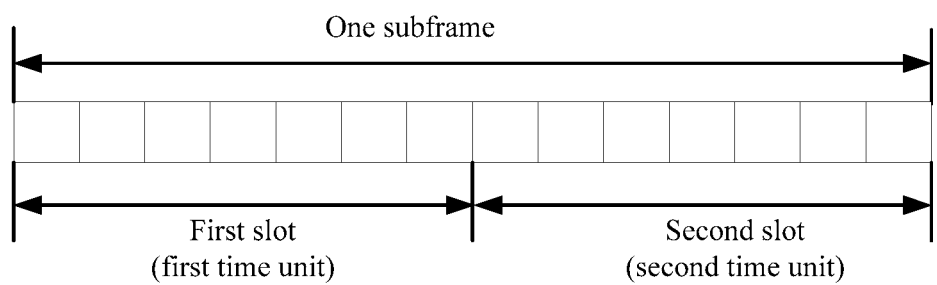
FIG. 2B is a schematic diagram of a subframe including two time units according to an embodiment of the present invention.

In this embodiment of the present invention, optionally, when $N_T=2$, two time units included in the subframe are a first time unit and a second time unit, the first time unit is located in the $1^{st}$ slot of the subframe, and the second time unit is located in the $2^{nd}$ slot of the subframe, as shown in FIG. 2B.

Figure 2C:
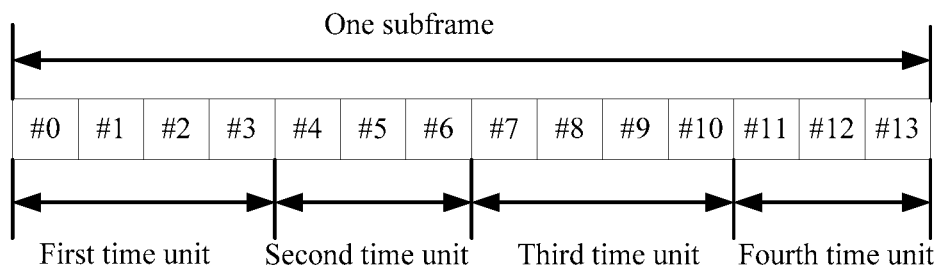
FIG. 2C is a schematic diagram of a subframe including four time units according to an embodiment of the present invention.

When $N_T=4$, optionally, four time units included in the subframe are a first time unit, a second time unit, a third time unit, and a fourth time unit, the first time unit is located in a first symbol set {#0, #1, #2, #3}, the second time unit is located in a second symbol set {#4, #5, #6}, the third time unit is located in a third symbol set {#7, #8, #9, #10}, and the fourth time unit is located in a fourth symbol set {#11, #12, #13}, as shown in FIG. 2C. In this embodiment of the present invention, for the normal CP, the first time unit is located in a first symbol set {#0, #1, #2}, the second time unit is located in a second symbol set {#3, #4, #5, #6}, the third time unit is located in a third symbol set {#7, #8, #9}, and the fourth time unit is located in a fourth symbol set {#10, #11, #12, #13}.

Alternatively, for the extended CP, $N_T=4$, and every three consecutive symbols constitute a time unit. Alternatively, for the normal CP, $N_T=7$, and every two consecutive symbols constitute a time unit. Alternatively, for the extended CP, $N_T=6$, and every two consecutive symbols constitute a time unit. Alternatively, for the normal CP, $N_T=14$, and each symbol is a time unit. Alternatively, for the extended CP, $N_T=12$, and each symbol is a time unit.

In this embodiment of the present invention, further, before determining the first channel resource, the base station further needs to determine an aggregation level AL.

In this embodiment of the present invention, a value of the aggregation level is a positive integer, such as 1, 2, 4, 8, 16, or 32. Specifically, the base station may determine the aggregation level of the first channel resource according to the following operation:

determining, by the base station, the AL according to a channel state of the terminal device.

For example, the base station may determine the AL according to channel state information (CSI) of the terminal device. When the channel state is poor, a high aggregation level such as 8 is selected; or when the channel state is good, a low aggregation level such as 1 is selected.

Optionally, the base station determines that the aggregation level AL is L within duration T, where L is a positive integer. Correspondingly, the terminal device may determine that the AL is L within the duration T. The aggregation level remains unchanged within a period of time. Therefore, after the terminal device detects DCI once within T and learns that an AL of a channel resource that carries the DCI is L, the terminal device needs to perform blind detection only on a candidate channel resource with the AL being L subsequently, to further determine the DCI. This reduces a quantity of DCI blind detections, improves a processing speed of the terminal device, and reduces power consumption of the terminal device.

For example, the base station sends DCI for four times within the duration T. When the terminal device detects DCI that is sent by the base station for the first time, the terminal device does not know the AL. Therefore, the terminal device needs to detect candidate channel resources corresponding to all ALs, to determine the DCI. After the terminal device learns, by detecting the DCI that is sent by the base station for the first time, that the AL is L, at the subsequent three times, the terminal device needs to detect only a candidate channel resource with the AL being L, to determine the DCI.

Optionally, after determining that the AL is L, the base station sends signaling to the terminal device. The signaling may be used to indicate that the AL of the first channel resource is L, where L is a positive integer. In this way, the terminal device does not need to perform blind detection on the candidate channel resources corresponding to all the ALs each time, to obtain the DCI. This reduces processing complexity of the terminal device.

In this embodiment of the present invention, when the base station determines the first channel resource, optionally, the following manner may be used:

determining, by the base station, M candidate channel resources, where an AL of each of the M candidate channel resources is L, and M is a positive integer; and selecting, by the base station, a candidate channel resource from the M candidate channel resources as the first channel resource.

In this embodiment of the present invention, when M=1, the candidate channel resource is directly used as the first channel resource, or when M is greater than 1, the first channel resource needs to be selected from the candidate channel resources.

For example, the base station determines three candidate channel resources. An AL of each of the three candidate channel resources is L. The base station selects a candidate channel resource from the three candidate channel resources, and uses the selected candidate channel resource as the first channel resource.

In this embodiment of the present invention, when the base station selects the candidate channel resource from the M candidate channel resources, optionally, the following manner may be used:

using, by the base station, the $1^{st}$ detected idle candidate channel resource as the first channel resource.

Alternatively, the following manner may be used:

selecting, by the base station according to an identifier of the terminal device, the candidate channel resource from the M candidate channel resources as the first channel resource.

Optionally, the UE ID (UE Identifier, terminal device identifier) may be a C-RNTI (Cell Radio Network Temporary Identifier, cell radio network temporary identifier) or an SPS C-RNTI (Semi-Persistent Scheduling C-RNTI, semi-persistent scheduling C-RNTI).

For example, the first channel resource is the $k^{th}$ candidate channel resource of the M candidate channel resources, where $k=F(n_{RNTI})$. $F(n_{RNTI})$ represents a function using $n_{RNTI}$ as a parameter, and $n_{RNTI}$ is the UE ID.

For example, $F(n_{RNTI})=n_{RNTI}$ mod M.

In this way, the terminal device does not need to perform blind detection on the M candidate channel resources with the AL being L.

In this embodiment of the present invention, a value of M is related to a quantity of DCI blind detections performed by the terminal device. To keep an appropriate quantity of blind detections, the value of M cannot be extremely large. M may be related to the aggregation level. For example, when the aggregation level is 1 or 2, M is equal to 4; when the aggregation level is 4, M is equal to 2; or when the aggregation level is 8, M is equal to 1. For another example, when the aggregation level is 1 or 2, M is equal to 2.

When the aggregation level is 1 or 2, and M is equal to 2, optionally, the two candidate channel resources with the aggregation level being 1 or 2 may be respectively located at an upper sideband and a lower sideband of an available bandwidth.

When the aggregation level is 4 or 8, and M is equal to 1, the candidate channel resources with the aggregation level being 4 or 8 may be both located at an upper sideband or a lower sideband of an available bandwidth. Optionally, the candidate channel resource with the aggregation level being 4 and the candidate channel resource with the aggregation level being 8 are respectively located at an upper sideband and a lower sideband of an available bandwidth.

Optionally, the value of M is related to $N_T$.

It should be noted that, M is for one time unit. That is, one time unit has M candidate channel resources with the aggregation level being L. For example, if $N_T$ is equal to 2, and L is equal to 1 or 2, M is equal to 3;

if $N_T$ is equal to 2, and L is equal to 4 or 8, M is equal to 1;

if $N_T$ is equal to 4, 6, 7, 12, or 14, and L is equal to 1 or 2, M is equal to 1 or 2; and if $N_T$ is equal to 4, 6, 7, 12, or 14, and L is equal to 4 or 8, M is equal to 1.

In this embodiment of the present invention, the DCI includes information used to indicate a transmission resource. Further, after the sending, by the base station, DCI to a terminal device on the first channel resource, the following operation is further included:

performing, by the base station, data transmission with the terminal device on the transmission resource.

In this embodiment of the present invention, the transmission resource indicated by the DCI occupies one time unit in the time domain. Optionally, when the time unit includes a PDCCH symbol, a data transmission resource indicated by resource allocation information occupies, in the time domain, a symbol in the time unit except the PDCCH symbol.

For example, the data transmission resource indicated by the resource allocation information occupies one slot, or two, three, or four symbols in the time domain. In this way, the DCI may be used for short TTI data transmission scheduling.

In this embodiment of the present invention, optionally, in downlink data transmission, the base station sends a downlink data packet to the terminal device on the transmission resource indicated by the DCI. A time domain resource occupied by the transmission resource is located in the $i^{th}$ time unit. That is, the downlink data packet and the DCI are located in the same time unit.

In this embodiment of the present invention, optionally, in uplink data transmission, the base station receives, on the transmission resource indicated by the DCI, an uplink data packet that is sent by the terminal device. A time domain resource occupied by the transmission resource is located in the $(i+K)^{th}$ time unit. That is, a time unit occupied by the uplink data packet is the $K^{th}$ time unit following the $i^{th}$ time unit that is occupied by the DCI, where K is an integer greater than or equal to 4.

For example, if $N_T$ is 4, K is 4, and the DCI is located in the first time unit (i=1) of a subframe 0, the time domain resource occupied by the transmission resource is the $1^{st}$ time unit of a subframe 1.

In uplink data transmission, there is a case that the terminal device sends only CSI on a PUSCH, that is, the terminal device does not send, on the PUSCH, a transport block that carries a uplink shared channel (UL-SCH), and sends only a control information feedback (CIF) corresponding to a current PUSCH report mode. In this case, the base station receives, on the transmission resource indicated by the DCI, the CSI sent by the terminal device. In this case, the time domain resource occupied by the transmission resource is a time unit in a subframe. For example, the time domain resource occupied by the transmission resource is the $(i+K)^{th}$ time unit. Alternatively, optionally, the time domain resource occupied by the transmission resource is a subframe or 1 ms. For example, when (i+k) mod $N_T=1$, the time domain resource occupied by the transmission resource is a subframe or 1 ms that is occupied by the $(i+K)^{th}$ time unit; or when (i+k) mod $N_T>1$, the time domain resource occupied by the transmission resource is the $1^{st}$ subframe or 1 ms following the $(i+K)^{th}$ time unit.

For example, if $N_T$ is 4, K is 4, and the DCI is located in the $1^{st}$ time unit (i=1) of a subframe 0, the time domain resource occupied by the transmission resource is a subframe 1. For example, if $N_T$ is 4, K is 4, and the DCI is located in the $3^{rd}$ time unit of the subframe 0, the time domain resource occupied by the transmission resource is a subframe 2.

In this embodiment of the present invention, the DCI further includes at least one of uplink scheduling information, downlink scheduling information, or information for requesting aperiodic CSI reporting.

The uplink scheduling information or the downlink scheduling information includes at least one of the following information: the information used to indicate the transmission resource, an modulation and coding scheme (MCS), precoding, an antenna port quantity, or a number of layers.

Further, the uplink scheduling information may further include configuration information indicating an uplink reference signal. For example, the configuration information indicates a time domain resource, a frequency domain resource, or a code domain resource that is occupied by the uplink reference signal.

The downlink scheduling information may further include configuration information indicating a downlink reference signal. For example, the configuration information indicates a type of a downlink reference signal, or a time domain resource, a frequency domain resource, or a code domain resource that is occupied by the downlink reference signal.

Optionally, in downlink data transmission, the transmission resource indicated by the DCI is unavailable to carry DCI of another terminal device. That is, the base station sends the DCI of the another terminal device not on the transmission resource. It should be noted that, if the first channel resource is located in the transmission resource indicated by the DCI, a remaining transmission resource, different from the first channel resource, in the transmission resource indicated by the DCI is not used to carry the DCI of the another terminal device. In this way, when receiving downlink data, the terminal device knows that there is no DCI of another terminal device on a data transmission resource allocated to the terminal device. If such a constraint does not exist, the terminal device does not know whether there is DCI of another terminal device on the data transmission resource allocated to the terminal device. Therefore, the base station needs to notify the terminal device by using an additional DCI bit, or the base station always reserves some transmission resources that may carry the DCI of the another terminal device. These resources cannot be used for downlink data transmission, and resource waste is caused.

In this embodiment of the present invention, optionally, the $i^{th}$ time unit includes at least one data symbol, and the first channel resource is located at a data symbol in the $i^{th}$ time unit in the time domain.

In this embodiment of the present invention, the data symbol is a symbol, different from a PDCCH symbol, in a subframe, or a symbol, in a subframe, whose corresponding sequence number is different from a sequence number of a PDCCH symbol. The PDCCH symbol defined in Rel-8 is a symbol used to transmit a PDCCH.

When a downlink system bandwidth is less than or equal to 10 RBs (Resource Block, resource block), in a subframe, the PDCCH symbol is the first two, three, or four symbols of the subframe, and the data symbol is a symbol in the subframe different from the first two, three, or four symbols. When a downlink system bandwidth is greater than 10 RBs, in a subframe, the PDCCH symbol is the first one, two, or three symbols of the subframe, and the data symbol is a symbol in the subframe different from the first one, two, or three symbols.

Optionally, the base station may notify, by using a control format indicator (CFI) carried on a physical control format indicator channel (PCFICH) or higher layer signaling, the terminal device of a PDCCH symbol quantity or a data symbol quantity.

In this embodiment of the present invention, optionally, the base station determines the first channel resource according to whether the $i^{th}$ time unit includes a PDCCH symbol. Specifically, when the $i^{th}$ time unit includes a PDCCH symbol, the first channel resource is located at the PDCCH symbol in the $i^{th}$ time unit in the time domain; or when the $i^{th}$ time unit does not include a PDCCH symbol, and includes at least one data symbol, the first channel resource is located at a data symbol in the $i^{th}$ time unit in the time domain.

In this manner, when the first channel resource is located at the PDCCH symbol in the $i^{th}$ time unit in the time domain, the first channel resource is a PDCCH candidate in a UESS or a CSS.

Optionally, the CSS is composed of 16 CCEs, the CSS includes four PDCCH candidates with an aggregation level being 4, and the CSS includes two PDCCH candidates with the aggregation level being 8.

Optionally, the UESS is a PDCCH UESS. The UESS includes $M_1$ PDCCH candidates with an aggregation level being 1, the UESS includes $M_2$ PDCCH candidates with the aggregation level being 2, the UESS includes $M_4$ PDCCH candidates with the aggregation level being 4, and the UESS includes $M_8$ PDCCH candidates with the aggregation level being 8, where $M_1$ and $M_2$ are positive integers less than 6, and $M_4$ and $M_8$ are positive integers less than 2.

In this embodiment of the present invention, optionally, when the first channel resource is located at the data symbol in the $i^{th}$ time unit in the time domain, the first channel resource includes X resource units (RUs), and any one of the X RUs occupies one symbol in the time domain, and occupies $N_{sc}^{RB}$ subcarriers in a frequency domain, where X is a positive integer.

Optionally, $N_{sc}^{RB}=12$.

In this embodiment of the present invention, optionally, the first channel resource is located at the $1^{st}$ data symbol in the $i^{th}$ time unit in the time domain, and occupies the X RUs in the frequency domain. Optionally, this solution is applicable only to a case that Y is greater than or equal to X, where Y is a quantity of RUs occupied by an available bandwidth in the frequency domain.

For example, when X is 6, on the $1^{st}$ data symbol in the $i^{th}$ time unit, the first channel resource occupies six RUs at an available bandwidth in the frequency domain.

In this embodiment of the present invention, optionally, the first channel resource is located at the first N data symbols in the $i^{th}$ time unit in the time domain; and for each of the N data symbols, the first channel resource occupies $$\frac{X}{N}$$

RUs in the frequency domain, where N is less than or equal to a total quantity of data symbols included in the $i^{th}$ time unit. Optionally, this solution is applicable to a case that Y is less than X. For example, when X is 12 and N is 2, for each of two data symbols, the first channel resource occupies six RUs in the frequency domain.

In this embodiment of the present invention, optionally, the first channel resource is located at the first N data symbols in the $i^{th}$ time unit in the time domain; and for the first N-1 data symbols of the N data symbols, the first channel resource occupies W RUs in the frequency domain, and for the $N^{th}$ data symbol of the N data symbols, the first channel resource occupies X−W*(N−1) RUs in the frequency domain, where N is less than or equal to a total quantity of data symbols included in the $i^{th}$ time unit, W is less than or equal to Y, and X−W*(N−1) is less than or equal to Y. Optionally, this solution is applicable to a case that Y is less than X.

For example, when X is 24, Y is 15, and N is 2, for the $1^{st}$ data symbol of two data symbols, the first channel resource occupies all of 15 RUs in the frequency domain, and for the $2^{nd}$ data symbol of the two data symbols, the first channel resource occupies nine RUs in the frequency domain.

In this embodiment of the present invention, optionally, X=L*Q. Q is a positive integer. Optionally, Q is 3. When L is 1, the first channel resource includes three RUs; or when L is 4, the first channel resource includes 12 RUs. Q indicates a quantity of RUs included in a data-symbol control information element (DsCCE), and the DsCCE is a smallest resource occupied by the first channel resource.

In this embodiment of the present invention, the available bandwidth is a system bandwidth, an available bandwidth for short TTI data transmission, or a specified bandwidth. The available bandwidth for short TTI data transmission is a frequency domain bandwidth that can be occupied for short TTI data transmission.

Optionally, after determining the available bandwidth for short TTI data transmission, the base station needs to send, to the terminal device, signaling indicating the available bandwidth for short TTI data transmission.

Optionally, the specified bandwidth is a predefined bandwidth or a bandwidth configured by the base station.

In this embodiment of the present invention, optionally, when the first channel resource is located at the data symbol in the $i^{th}$ time unit in the time domain, the first channel resource is a localized channel resource or a distributed channel resource. When the first channel resource is the localized channel resource, the first channel resource is consecutively distributed in the frequency domain; or when the first channel resource is the distributed channel resource, the first channel resource is inconsecutively distributed in the frequency domain.

To obtain a frequency diversity gain, when a channel state is poor, the distributed channel resource is used. When the channel state is poor, a high aggregation level is selected. Therefore, the base station can determine that a first channel resource with a high aggregation level is a distributed channel resource, and the frequency diversity gain can be obtained. For example, a first channel resource with an aggregation level being 1 or 2 is a localized channel resource, and a first channel resource with an aggregation level being 4 or 8 is a distributed channel resource. Correspondingly, a candidate channel resource with an aggregation level being 1 or 2 is a localized channel resource, and a candidate channel resource with an aggregation level being 4 or 8 is a distributed channel resource.

In this embodiment of the present invention, optionally, the DCI includes the information used to indicate the transmission resource.

In this embodiment of the present invention, optionally, the transmission resource occupies at least one enhanced resource block group (ERBG) in the frequency domain. Any ERBG occupies P RBs in the frequency domain, where P is an integer greater than 1. Optionally, the ERBG includes a localized ERBG (LERBG) and a distributed ERBG (DERBG). The LERBG occupies consecutive subcarriers in the frequency domain, and the DERBG occupies inconsecutive subcarriers in the frequency domain. In other words, the LERBG occupies P consecutive RBs in the frequency domain, and the DERBG occupies P inconsecutive RBs in the frequency domain.

Figure 2D:
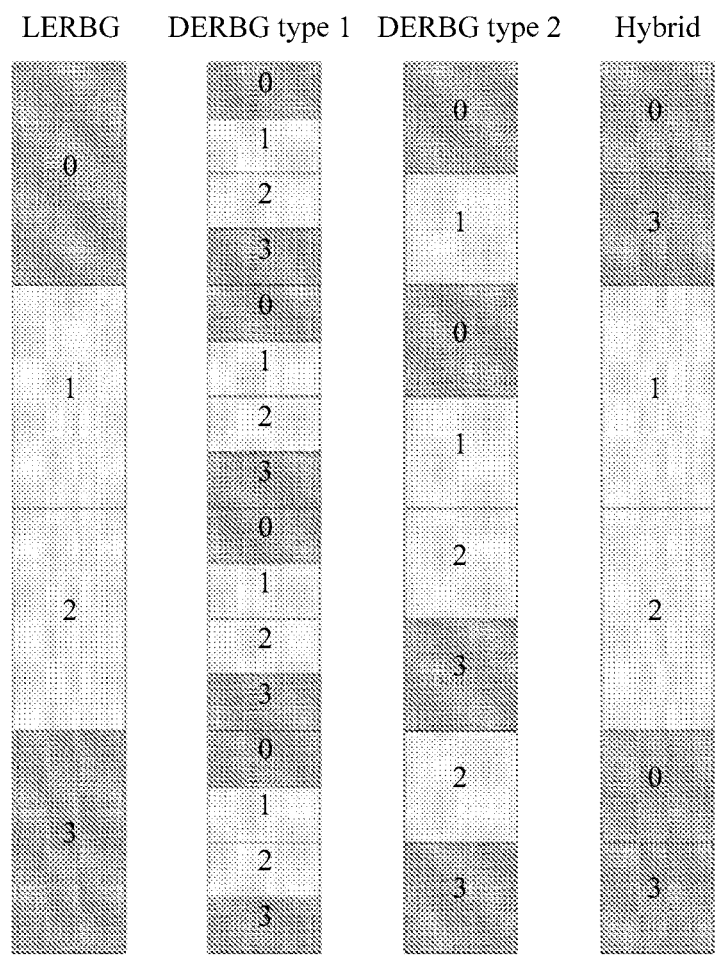
FIG. 2D is a schematic diagram of an LERBG and a DERBG according to an embodiment of the present invention.

For example, when a system bandwidth is 20 MHz (including 100 RBs), if P is 25, the entire system bandwidth includes LERBGs and DERBGs corresponding to four ERBGs, as shown in FIG. 2D.

If the first channel resource is the localized channel resource, the transmission resource occupies at least one LERBG in the frequency domain. It should be noted that, when the transmission resource occupies two or more LERBGs in the frequency domain, the two or more LERBGs may be consecutively or inconsecutively distributed in the frequency domain.

If the first channel resource is the distributed channel resource, the transmission resource occupies at least one DERBG in the frequency domain. That is, when the first channel resource that carries the DCI is the distributed channel resource, the transmission resource indicated by the DCI occupies inconsecutive frequency domain resources.

In this embodiment of the present invention, optionally, if $N_T=2$, and the $i^{th}$ time unit is the first time unit, the first channel resource is a PDCCH in a first control region, and the first control region is located at the first $N_{sym1}$ symbols in the 1$^{st}$ slot; and if $N_T=2$, and the $i^{th}$ time unit is the second time unit, the first channel resource is a PDCCH in a second control region, and the second control region is located at the first $N_{sym2}$ symbols in the 2$^{nd}$ slot.

$N_{sym1}$ is 1, 2, 3, or 4, and $N_{sym2}$ is an integer or a positive integer. Optionally, $N_{sym2}$ is 1, 2, or 3. Optionally, $N_{sym2}$ is 0, 1, 2, or 3, or $N_{sym2}$ is 1, 2, or 3. When $N_{sym2}$ is 0, it indicates that the second time unit has no second control region.

Optionally, a quantity of frequency domain resources occupied by the second control region is less than or equal to a quantity of frequency domain resources occupied by the first control region. Alternatively, the second control region is located at an available bandwidth in the frequency domain, so that the second control region is equal to or less than the available bandwidth. It should be noted that, when the first control region occupies the entire system bandwidth, if the second control region also occupies the entire system bandwidth, data transmission of an old-version terminal device is affected. The old-version terminal device does not know existence of the second control region. Therefore, to bypass the second control region, the base station cannot schedule, in one carrier and in one subframe, the old-version terminal device and a terminal device that supports short TTI transmission. In order not to affect data transmission of the old-version terminal device, optionally, the quantity of frequency domain resources occupied by the second control region is less than the quantity of frequency domain resources occupied by the first control region. In this way, the base station can schedule the old-version terminal device at a frequency band beyond the second control region.

Optionally, the first control region is a control region defined in the LTE Rel-8. Any PDCCH in the first control region is a PDCCH defined in the LTE Rel-8. The first channel resource is a PDCCH in a CSS or a UESS, where the CSS and/or the UESS are/is located in the first control region.

If $N_T=2$, and the $i^{th}$ time unit is the second time unit, the first channel resource is a PDCCH in an further enhanced CSS (feCSS) or afurther enhanced UESS (feUESS), where the feUESS and/or the feCSS are/is located in the second control region.

To balance quantities of blind detections performed in the two time units by the terminal device, optionally, in the first time unit or the second time unit, the UESS includes three PDCCH candidates with an aggregation level being 1 or 2, and the UESS includes one PDCCH candidate with an aggregation level being 4 or 8.

In this embodiment of the present invention, further, before the determining, by a base station, a first channel resource, the following operation is further included:

sending, by the base station to the terminal device, signaling indicating a value of $N_{sym2}$.

The signaling is a control format indicator (CFI) carried on a physical control format indicator channel (PCFICH) in the 1$^{st}$ slot, or a CFI carried on a PCFICH in the 2$^{nd}$ slot, or DCI carried on a PDCCH in the 1$^{st}$ slot, or higher layer signaling.

Optionally, the base station configures $N_{sym1}$ to be equal to $N_{sym2}$. Further, the base station sends, to the terminal device, the CFI that is carried on the PCFICH in the 1$^{st}$ slot, where the CFI indicates values of $N_{sym1}$ and $N_{sym2}$. In this way, there is only one PCFICH in one subframe. Compared with an existing system, no additional PCFICH overhead is caused.

Optionally, the base station configures $N_{sym2}=F(N_{sym1})$, where $F(N_{sym1})$ represents a function using $N_{sym1}$ as a parameter. Further, the base station sends, to the terminal device, the CFI that is carried on the PCFICH in the 1$^{st}$ slot, where the CFI indicates a value of $N_{sym1}$. The terminal device may calculate a value of $N_{sym2}$ according to $N_{sym2}=F(N_{sym1})$. Therefore, the CFI indicates the value of $N_{sym2}$ implicitly. Optionally, $F(N_{sym1})=k \times N_{sym1}$ or $F(N_{sym1})=\min(\lceil k \times N_{sym1} \rceil, N_{max})$, where k is a positive number, $\lceil \rceil$ represents round-up, and $N_{max}$ is 1, 2, 3, or 4. In this way, there is only one PCFICH in one subframe. Compared with an existing system, no additional PCFICH overhead is caused.

Optionally, the base station configures $N_{sym2}$. Further, the base station sends, to the terminal device, the CFI that is carried on the PCFICH in the $2^{nd}$ slot, where the CFI indicates a value of $N_{sym2}$. In this way, the base station may configure a quantity of PDCCH symbols in the $1^{st}$ time unit and a quantity of PDCCH symbols in the $2^{nd}$ time unit separately according to a requirement, where the quantities may be the same or different. This improves flexibility of a subframe.

In this solution, the first channel resource that carries the DCI is located in the $i^{th}$ time unit of the subframe in the time domain, where i is a positive integer less than or equal to $N_T$. That is, there is a first channel resource in each time unit of the subframe. Therefore, when data needs to be transmitted in any time unit, the data can be transmitted immediately, instead of waiting until a next subframe. This reduces a scheduling delay.

Embodiment 2

Figure 3:
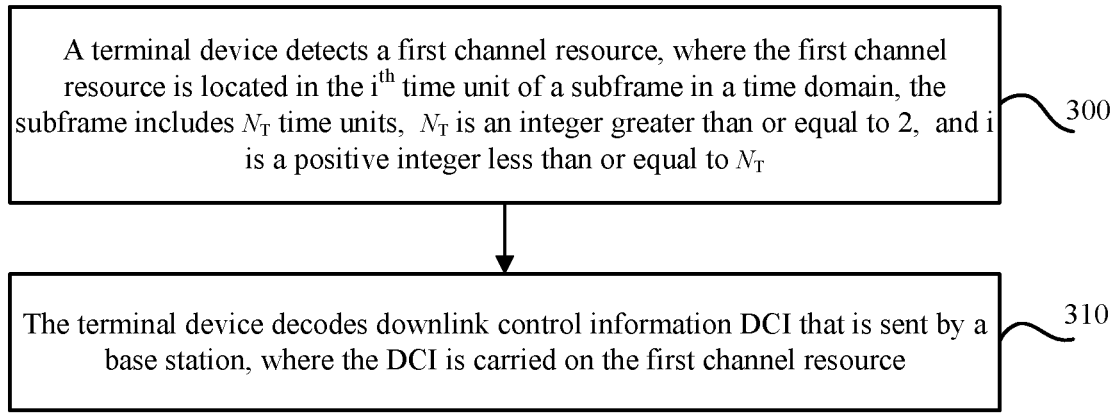
FIG. 3 is another flowchart for sending DCI according to an embodiment of the present invention.

Referring to FIG. 3, in this embodiment of the present invention, another procedure for sending DCI is as follows:

Step 300: A terminal device detects a first channel resource, where the first channel resource is located in the $i^{th}$ time unit of a subframe in a time domain, the subframe includes $N_T$ time units, $N_T$ is an integer greater than or equal to 2, and i is a positive integer less than or equal to $N_T$.

Step 310: The terminal device decodes downlink control information DCI that is sent by a base station, where the DCI is carried on the first channel resource.

In this embodiment of the present invention, the subframe may be replaced with 1 ms. Therefore, step 300 may be described as follows:

A terminal device detects a first channel resource, where the first channel resource is located in the $i^{th}$ time unit of 1 ms in a time domain, 1 ms includes $N_T$ time units, $N_T$ is an integer greater than or equal to 2, and i is a positive integer less than or equal to $N_T$.

In this embodiment of the present invention, optionally, $N_T$ is at least one of 2, 4, 6, 7, 12, or 14.

Optionally, for a normal CP, $N_T$ is 2, 4, 7, or 14; for an extended CP, $N_T$ is 2, 4, 6, or 12.

It should be noted that, a time length of a subframe or 1 ms may be equal to a total time length of the $N_T$ time units. Alternatively, a time length of a subframe or 1 ms may be greater than a total time length of the $N_T$ time units.

In this embodiment of the present invention, optionally, when $N_T=2$, two time units included in the subframe are a first time unit and a second time unit, the first time unit is located in the $1^{st}$ slot of the subframe, and the second time unit is located in the $2^{nd}$ slot of the subframe, as shown in FIG. 2B.

When $N_T=4$, four time units included in the subframe are a first time unit, a second time unit, a third time unit, and a fourth time unit, the first time unit is located in a first symbol set {#0, #1, #2, #3}, the second time unit is located in a second symbol set {#4, #5, #6}, the third time unit is located in a third symbol set {#7, #8, #9, #10}, and the fourth time unit is located in a fourth symbol set {#11, #12, #13}, as shown in FIG. 2C.

In this embodiment of the present invention, for the normal CP, the first time unit is located in a first symbol set {#0, #1, #2}, the second time unit is located in a second symbol set {#3, #4, #5, #6}, the third time unit is located in a third symbol set {#7, #8, #9}, and the fourth time unit is located in a fourth symbol set {#10, #11, #12, #13}.

In this embodiment of the present invention, for the extended CP, $N_T=4$, and every three consecutive symbols constitute a time unit. Alternatively, for the normal CP, $N_T=7$, and every two consecutive symbols constitute a time unit. Alternatively, for the extended CP, $N_T=6$, and every two consecutive symbols constitute a time unit. Alternatively, for the normal CP, $N_T=14$, and each symbol is a time unit. Alternatively, for the extended CP, $N_T=12$, and each symbol is a time unit.

In this embodiment of the present invention, further, before the detecting, by a terminal device, a first channel resource, the following operation is further included:

determining, by the terminal device, that an AL is L within duration T, where L is a positive integer.

The AL remains unchanged within a period of time. Therefore, after the terminal device detects DCI once within T and learns that an AL of a channel resource that carries the DCI is L, the terminal device needs to perform blind detection only on a candidate channel resource with the AL being L subsequently, to determine the DCI. This reduces a quantity of DCI blind detections, improves a processing speed of the terminal device, and reduces power consumption of the terminal device.

For example, the base station sends DCI for four times within the duration T. When the terminal device detects DCI that is sent by the base station for the first time, the terminal device does not know the AL. Therefore, the terminal device needs to detect candidate channel resources corresponding to all ALs, to determine the DCI. After the terminal device learns, by detecting the DCI that is sent by the base station for the first time, that the AL is L, at the subsequent three times, the terminal device needs to detect only a candidate channel resource with the AL being L, to determine the DCI.

In this embodiment of the present invention, further, before the detecting, by a terminal device, a first channel resource, the following operation is further included:

receiving, by the terminal device, signaling sent by the base station, and determining, according to the signaling, that the AL is L, where the signaling is used to indicate that an AL of the first channel resource is L, and L is a positive integer.

In this way, the terminal device does not need to perform blind detection on the candidate channel resources corresponding to all the ALs each time, to obtain the DCI. This reduces processing complexity of the terminal device.

In this embodiment of the present invention, a value of the aggregation level is a positive integer, such as 1, 2, 4, 8, 16, or 32.

In this embodiment of the present invention, when the terminal device detects the first channel resource, optionally, the following manner may be used:

determining, by the terminal device, M candidate channel resources, where an AL of each of the M candidate channel resources is L, and M is a positive integer; and finding, by the terminal device, a candidate channel resource from the M candidate channel resources as the first channel resource.

In this embodiment of the present invention, when the terminal device finds a candidate channel resource from the M candidate channel resources as the first channel resource, optionally, the following manner may be used:

finding, by the terminal device according to an identifier of the terminal device, the candidate channel resource from the M candidate channel resources as the first channel resource.

For example, the terminal device determines three candidate channel resources. An AL of each of the three candidate channel resources is L. The terminal device finds a candidate channel resource from the three candidate channel resources, and uses the found candidate channel resource as the first channel resource.

Optionally, the UE ID may be a C-RNTI or an SPS C-RNTI.

For example, the first channel resource is the $k^{th}$ candidate channel resource of the M candidate channel resources, where $k=F(n_{RNTI})$, $F(n_{RNTI})$ represents a function using $n_{RNTI}$ as a parameter, and $n_{RNTI}$ is a UE ID. For example, $F(n_{RNTI})=n_{RNTI} \bmod M$.

In this way, the terminal device does not need to perform blind detection on the M candidate channel resources with the aggregation level being L.

In this embodiment of the present invention, a value of M is related to a quantity of DCI blind detections performed by the terminal device. To keep an appropriate quantity of blind detections, the value of M cannot be extremely large. M may be related to the aggregation level. For example, when the aggregation level is 1 or 2, M is equal to 4; when the aggregation level is 4, M is equal to 2; or when the aggregation level is 8, M is equal to 1. For another example, when the aggregation level is 1 or 2, M is equal to 2.

When the aggregation level is 1 or 2, and M is equal to 2, optionally, the two candidate channel resources with the aggregation level being 1 or 2 may be respectively located at an upper sideband and a lower sideband of an available bandwidth.

When the aggregation level is 4 or 8, and M is equal to 1, the candidate channel resources with the aggregation level being 4 or 8 may be both located at an upper sideband or a lower sideband of an available bandwidth. Optionally, the candidate channel resource with the aggregation level being 4 and the candidate channel resource with the aggregation level being 8 are respectively located at an upper sideband and a lower sideband of an available bandwidth.

In this embodiment of the present invention, optionally, the value of M is related to $N_T$.

It should be noted that, M is for one time unit. That is, one time unit has M candidate channel resources with the aggregation level being L.

For example, if $N_T$ is equal to 2, and L is equal to 1 or 2, M is equal to 3;

if $N_T$ is equal to 2, and L is equal to 4 or 8, M is equal to 1;

if $N_T$ is equal to 4, 6, 7, 12, or 14, and L is equal to 1 or 2, M is equal to 1 or 2; and if $N_T$ is equal to 4, 6, 7, 12, or 14, and L is equal to 4 or 8, M is equal to 1.

In this embodiment of the present invention, optionally, the DCI includes information used to indicate a transmission resource.

After the decoding, by the terminal device, DCI that is sent by a base station, the following operation is further included:

performing, by the terminal device, data transmission with the base station on the transmission resource.

In this embodiment of the present invention, the transmission resource indicated by the DCI occupies one time unit in the time domain. Optionally, when the time unit includes a PDCCH symbol, a data transmission resource indicated by resource allocation information occupies, in the time domain, a symbol in the time unit except the PDCCH symbol.

For example, the data transmission resource indicated by the resource allocation information occupies one slot, or two, three, or four symbols in the time domain. In this way, the DCI may be used for short TTI data transmission scheduling.

In this embodiment of the present invention, optionally, in downlink data transmission, the terminal device receives a downlink data packet that is sent by the base station on the transmission resource indicated by the DCI. A time domain resource occupied by the transmission resource is located in the $i^{th}$ time unit. That is, the downlink data packet and the DCI are located in the same time unit.

In this embodiment of the present invention, optionally, in uplink data transmission, the terminal device sends an uplink data packet to the base station on the transmission resource indicated by the DCI. A time domain resource occupied by the transmission resource is located in the $(i+K)^{th}$ time unit. That is, a time unit occupied by the uplink data packet is the $K^{th}$ time unit following the $i^{th}$ time unit that is occupied by the DCI, where K is an integer greater than or equal to 4.

For example, if $N_T$ is 4, K is 4, and the DCI is located in the 1st time unit (i=1) of a subframe 0, the time domain resource occupied by the transmission resource is the $1^{st}$ time unit of a subframe 1.

In uplink data transmission, there is a case that the terminal device sends only CSI on a PUSCH, that is, the terminal device does not send, on the PUSCH, a transport block that carries a UL-SCH, and sends only a CIF corresponding to a current PUSCH report mode. In this case, the terminal device sends the CSI to the base station on the transmission resource indicated by the DCI. In this case, the time domain resource occupied by the transmission resource is a time unit in a subframe. For example, the time domain resource occupied by the transmission resource is the $(i+K)^{th}$ time unit. Alternatively, optionally, the time domain resource occupied by the transmission resource is a subframe or 1 ms. For example, when $(i+k) \bmod N_T=1$, the time domain resource occupied by the transmission resource is a subframe or 1 ms that is occupied by the $(i+K)^{th}$ time unit; or when $(i+k) \bmod N_T>1$, the time domain resource occupied by the transmission resource is the $1^{st}$ subframe or 1 ms following the $(i+K)^{th}$ time unit.

For example, if $N_T$ is 4, K is 4, and the DCI is located in the first time unit (i=1) of a subframe 0, the time domain resource occupied by the transmission resource is a subframe 1. For example, if $N_T$ is 4, K is 4, and the DCI is located in the $3^{rd}$ time unit of the subframe 0, the time domain resource occupied by the transmission resource is a subframe 2.

In this embodiment of the present invention, the DCI further includes at least one of uplink scheduling information, downlink scheduling information, or information for requesting aperiodic CSI reporting.

The uplink scheduling information or the downlink scheduling information includes at least one of the following information: the information used to indicate the transmission resource, an MCS, precoding, an antenna port quantity, or a number of layers.

Further, the uplink scheduling information may further include configuration information indicating an uplink reference signal. For example, the configuration information indicates a time domain resource, a frequency domain resource, or a code domain resource that is occupied by the uplink reference signal.

The downlink scheduling information may further include configuration information indicating a downlink reference signal. For example, the configuration information indicates a type of a downlink reference signal, or a time domain resource, a frequency domain resource, or a code domain resource that is occupied by the downlink reference signal.

In this embodiment of the present invention, optionally, the transmission resource is unavailable to carry DCI of another terminal device. That is, the base station sends the DCI of the another terminal device not on the transmission resource. It should be noted that, if the first channel resource is located in the transmission resource indicated by the DCI, a remaining transmission resource, different from the first channel resource, in the transmission resource indicated by the DCI is not used to carry the DCI of the another terminal device.

In this way, when receiving downlink data, the terminal device knows that there is no DCI of another terminal device on a data transmission resource allocated to the terminal device. If such a constraint does not exist, the terminal device does not know whether there is DCI of another terminal device on the data transmission resource allocated to the terminal device. Therefore, the base station needs to notify the terminal device by using an additional DCI bit, or the base station always reserves some transmission resources that may carry the DCI of the another terminal device. These resources cannot be used for downlink data transmission, and resource waste is caused.

In this embodiment of the present invention, optionally, the $i^{th}$ time unit includes at least one data symbol, and the first channel resource is located at a data symbol in the $i^{th}$ time unit in the time domain.

In this embodiment of the present invention, the data symbol is a symbol, different from a PDCCH symbol, in a subframe, or a symbol, in a subframe, whose corresponding sequence number is different from a sequence number of a PDCCH symbol. The PDCCH symbol defined in Rel-8 is a symbol used to transmit a PDCCH.

When a downlink system bandwidth is less than or equal to 10 RBs, in a subframe, the PDCCH symbol is the first two, three, or four symbols of the subframe, and the data symbol is a symbol in the subframe different from the first two, three, or four symbols. When a downlink system bandwidth is greater than 10 RBs, in a subframe, the PDCCH symbol is the first one, two, or three symbols of the subframe, and the data symbol is a symbol in the subframe different from the first one, two, or three symbols.

Optionally, the base station may notify, by using a CFI carried on a PCFICH or higher layer signaling, the terminal device of a PDCCH symbol quantity or a data symbol quantity.

In this embodiment of the present invention, optionally, when the $i^{th}$ time unit includes a PDCCH symbol, the first channel resource is located at the PDCCH symbol in the $i^{th}$ time unit in the time domain; or when the $i^{th}$ time unit does not include a PDCCH symbol, and includes at least one data symbol, the first channel resource is located at a data symbol in the $i^{th}$ time unit in the time domain.

In this manner, when the first channel resource is located at the PDCCH symbol in the $i^{th}$ time unit in the time domain, the first channel resource is a PDCCH candidate in a UESS or a CSS.

Optionally, the CSS includes 16 CCEs, the CSS includes four PDCCH candidates with an aggregation level being 4, and the CSS includes two PDCCH candidates with the aggregation level being 8.

Optionally, the UESS is a PDCCH UESS. The UESS includes $M_1$ PDCCH candidates with an aggregation level being 1, the UESS includes $M_2$ PDCCH candidates with the aggregation level being 2, the UESS includes $M_4$ PDCCH candidates with the aggregation level being 4, and the UESS includes $M_8$ PDCCH candidates with the aggregation level being 8, where $M_1$ and $M_2$ are positive integers less than 6, and $M_4$ and $M_8$ are positive integers less than 2.

In this embodiment of the present invention, optionally, when the first channel resource is located at the data symbol in the $i^{th}$ time unit in the time domain, the first channel resource includes X RUs, and any one of the X RUs occupies one symbol in the time domain, and occupies $N_{sc}^{RB}$ subcarriers in a frequency domain, where X is a positive integer.

Optionally, $N_{sc}^{RB}=12$.

In this embodiment of the present invention, optionally, the first channel resource is located at the $1^{st}$ data symbol in the $i^{th}$ time unit in the time domain, and occupies the X RUs in the frequency domain. Optionally, this solution is applicable only to a case that Y is greater than or equal to X, where Y is a quantity of RUs occupied by an available bandwidth in the frequency domain.

For example, when X is 6, on the $1^{st}$ data symbol in the $i^{th}$ time unit, the first channel resource occupies six RUs at an available bandwidth in the frequency domain.

In this embodiment of the present invention, optionally, the first channel resource is located at the first N data symbols in the $i^{th}$ time unit in the time domain; and for each of the N data symbols, the first channel resource occupies $$\frac{X}{N}$$

RUs in the frequency domain, where N is less than or equal to a total quantity of data symbols included in the $i^{th}$ time unit. Optionally, this solution is applicable to a case that Y is less than X. For example, when X is 12 and N is 2, for each of two data symbols, the first channel resource occupies six RUs in the frequency domain.

In this embodiment of the present invention, optionally, the first channel resource is located at the first N data symbols in the $i^{th}$ time unit in the time domain; and for the first N-1 data symbols of the N data symbols, the first channel resource occupies W RUs in the frequency domain, and for the $N^{th}$ data symbol of the N data symbols, the first channel resource occupies X−W*(N-1) RUs in the frequency domain, where N is less than or equal to a total quantity of data symbols included in the $i^{th}$ time unit, W is less than or equal to Y, and X−W*(N-1) is less than or equal to Y. Optionally, this solution is applicable to a case that Y is less than X.

For example, when X is 24, Y is 15, and N is 2, for the $1^{st}$ data symbol of two data symbols, the first channel resource occupies all of 15 RUs in the frequency domain, and for the $2^{nd}$ data symbol of the two data symbols, the first channel resource occupies nine RUs in the frequency domain.

In this embodiment of the present invention, optionally, X=L*Q. Q is a positive integer. Optionally, Q is 3. When L is 1, the first channel resource includes three RUs; or when L is 4, the first channel resource includes 12 RUs. Q indicates a quantity of RUs included in a DsCCE, and the DsCCE is a smallest resource occupied by the first channel resource.

In this embodiment of the present invention, the available bandwidth is a system bandwidth, an available bandwidth for short TTI data transmission, or a specified bandwidth. The available bandwidth for short TTI data transmission is a frequency domain bandwidth that can be occupied for short TTI data transmission.

Optionally, after determining the available bandwidth for short TTI data transmission, the base station needs to send, to the terminal device, signaling indicating the available bandwidth for short TTI data transmission.

Optionally, the specified bandwidth is a predefined bandwidth or a bandwidth configured by the base station.

In this embodiment of the present invention, optionally, when the first channel resource is located at the data symbol in the $i^{th}$ time unit in the time domain, the first channel resource is a localized channel resource or a distributed channel resource.

When the first channel resource is the localized channel resource, the first channel resource is consecutively distributed in the frequency domain; or when the first channel resource is the distributed channel resource, the first channel resource is inconsecutively distributed in the frequency domain.

To obtain a frequency diversity gain, when a channel state is poor, the distributed channel resource is used. When the channel state is poor, a high aggregation level is selected. Therefore, a first channel resource with a high aggregation level is a distributed channel resource, and the frequency diversity gain can be obtained. For example, a first channel resource with an aggregation level being 1 or 2 is a localized channel resource, and a first channel resource with an aggregation level being 4 or 8 is a distributed channel resource. Correspondingly, a candidate channel resource with an aggregation level being 1 or 2 is a localized channel resource, and a candidate channel resource with an aggregation level being 4 or 8 is a distributed channel resource.

In this embodiment of the present invention, optionally, the DCI includes the information used to indicate the transmission resource.

In this embodiment of the present invention, optionally, if the first channel resource is the localized channel resource, the transmission resource occupies at least one LERBG in the frequency domain; or if the first channel resource is the distributed channel resource, the transmission resource occupies at least one DERBG in the frequency domain.

Any ERBG occupies P RBs in the frequency domain, where P is an integer greater than 1. Optionally, the ERBG includes an LERBG and a DERBG The LERBG occupies consecutive subcarriers in the frequency domain, and the DERBG occupies inconsecutive subcarriers in the frequency domain. In other words, the LERBG occupies P consecutive RBs in the frequency domain, and the DERBG occupies P inconsecutive RBs in the frequency domain.

For example, when a system bandwidth is 20 MHz (including 100 RBs), if P is 25, the entire system bandwidth includes LERBGs and DERBGs corresponding to four ERBGs, as shown in FIG. 2D.

If the first channel resource is the localized channel resource, the transmission resource occupies at least one LERBG in the frequency domain. It should be noted that, when the transmission resource occupies two or more LERBGs in the frequency domain, the two or more LERBGs may be consecutively or inconsecutively distributed in the frequency domain.

If the first channel resource is the distributed channel resource, the transmission resource occupies at least one DERBG in the frequency domain. That is, when the first channel resource that carries the DCI is the distributed channel resource, the transmission resource indicated by the DCI occupies inconsecutive frequency domain resources.

In this embodiment of the present invention, optionally, if $N_T=2$, and the $i^{th}$ time unit is the first time unit, the first channel resource is a PDCCH in a first control region, and the first control region is located at the first $N_{sym1}$ symbols in the $1^{st}$ slot; and if $N_T=2$, and the $i^{th}$ time unit is the second time unit, the first channel resource is a PDCCH in a second control region, and the second control region is located at the first $N_{sym2}$ symbols in the $2^{nd}$ slot.

$N_{sym1}$ is 1, 2, 3, or 4, and $N_{sym2}$ is an integer or a positive integer. Optionally, $N_{sym2}$ is 1, 2, or 3. Optionally, $N_{sym2}$ is 0, 1, 2, or 3, or $N_{sym2}$ is 1, 2, or 3. When $N_{sym2}$ is 0, it indicates that the second time unit has no second control region.

Optionally, a quantity of frequency domain resources occupied by the second control region is less than or equal to a quantity of frequency domain resources occupied by the first control region. Alternatively, the second control region is located at an available bandwidth in the frequency domain, so that the second control region is equal to or less than the available bandwidth. It should be noted that, when the first control region occupies the entire system bandwidth, if the second control region also occupies the entire system bandwidth, data transmission of an old-version terminal device is affected. The old-version terminal device does not know existence of the second control region. Therefore, to bypass the second control region, the base station cannot schedule, in one carrier and in one subframe, the old-version terminal device and a terminal device that supports short TTI transmission. In order not to affect data transmission of the old-version terminal device, optionally, the quantity of frequency domain resources occupied by the second control region is less than the quantity of frequency domain resources occupied by the first control region. In this way, the base station can schedule the old-version terminal device at a frequency band beyond the second control region.

Optionally, the first control region is a control region defined in the LTE Rel-8. Any PDCCH in the first control region is a PDCCH defined in the LTE Rel-8. The first channel resource is a PDCCH in a CSS or a UESS, where the CSS and/or the UESS are/is located in the first control region.

If $N_T=2$, and the $i^{th}$ time unit is the second time unit, the first channel resource is a PDCCH in an feCSS or an feUESS, where the feUESS and/or feCSS are/is located in the second control region.

To balance quantities of blind detections performed in the two time units by the terminal device, optionally, in the first time unit or the second time unit, the UESS includes three PDCCH candidates with an aggregation level being 1 or 2, and the UESS includes one PDCCH candidate with an aggregation level being 4 or 8.

In this embodiment of the present invention, further, before the detecting, by a terminal device, a first channel resource, the following operation is further included:

receiving, by the terminal device, signaling that is used to indicate a value of $N_{sym2}$ and that is sent by the base station.

The signaling is a CFI carried on a PCFICH in the $1^{st}$ slot, or a CFI carried on a PCFICH in the $2^{nd}$ slot, or DCI carried on a PDCCH in the $1^{st}$ slot, or higher layer signaling.

Optionally, $N_{sym1}$ is equal to $N_{sym2}$. Further, the terminal device receives the CFI that is carried on the PCFICH in the $1^{st}$ slot and that is sent by the base station, where the CFI indicates values of $N_{sym1}$ and $N_{sym2}$. In this way, there is only one PCFICH in one subframe. Compared with an existing system, no additional PCFICH overhead is caused.

Optionally, $N_{sym2}=F(N_{sym1})$, where $F(N_{sym1})$ represents a function using $N_{sym1}$ as a parameter. Further, the terminal device receives the CFI that is carried on the PCFICH in the $1^{st}$ slot and that is sent by the base station, where the CFI indicates a value of $N_{sym1}$. The terminal device may calculate a value of $N_{sym2}$ according to $N_{sym2}=F(N_{sym1})$. Therefore, the CFI indicates the value of $N_{sym2}$ implicitly.

Optionally, $F(N_{sym1})=k \times N_{sym1}$ or $F(N_{sym1})=\min(\lceil k \times N_{sym1} \rceil, N_{max})$, where k is a positive number, $\lceil \, \rceil$ represents round-up, and $N_{max}$ is 1, 2, 3, or 4. In this way, there is only one PCFICH in one subframe. Compared with an existing system, no additional PCFICH overhead is caused.

Optionally, the base station configures $N_{sym2}$. Further, the terminal device receives the CFI that is carried on the PCFICH in the $2^{nd}$ slot and that is sent by the base station, where the CFI indicates a value of $N_{sym2}$. In this way, the base station may configure a quantity of PDCCH symbols in the $1^{st}$ time unit and a quantity of PDCCH symbols in the $2^{nd}$ time unit separately according to a requirement, where the quantities may be the same or different. This improves flexibility of a subframe.

In this solution, the first channel resource that carries the DCI is located in the $i^{th}$ time unit of the subframe in the time domain, where i is a positive integer less than or equal to $N_T$. That is, there is a first channel resource in each time unit of the subframe. Therefore, when data needs to be transmitted in any time unit, the data can be transmitted immediately, instead of waiting until a next subframe. This reduces a scheduling delay.

Embodiment 3

Figure 4A:
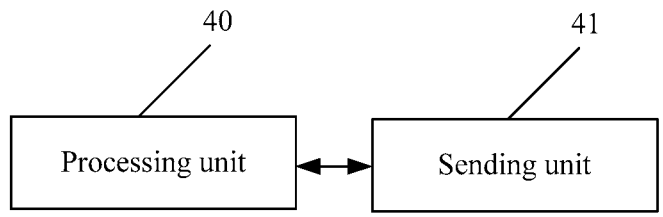
FIG. 4A is a schematic diagram of a base station according to an embodiment of the present invention.

Referring to FIG. 4A, in this embodiment of the present invention, a base station is provided. The base station includes a processing unit 40 and a sending unit 41.

The processing unit 40 is configured to determine a first channel resource, where the first channel resource is located in the $i^{th}$ time unit of a subframe in a time domain, the subframe includes $N_T$ time units, $N_T$ is an integer greater than or equal to 2, and i is a positive integer less than or equal to $N^T$.

The sending unit 41 is configured to send downlink control information DCI to a terminal device on the first channel resource.

In this embodiment of the present invention, optionally, $N_T$ is at least one of 2, 4, 6, 7, 12, or 14.

In this embodiment of the present invention, optionally, when $N_T=2$, 2 time units included in the subframe are a first time unit and a second time unit, the first time unit is located in the $1^{st}$ slot of the subframe, and the second time unit is located in the $2^{nd}$ slot of the subframe; or when $N_T=4$, four time units included in the subframe are a first time unit, a second time unit, a third time unit, and a fourth time unit, the first time unit is located in a first symbol set {#0, #1, #2, #3}, the second time unit is located in a second symbol set {#4, #5, #6}, the third time unit is located in a third symbol set {#7, #8, #9, #10}, and the fourth time unit is located in a fourth symbol set {#11, #12, #13}.

In this embodiment of the present invention, further, the processing unit 40 is further configured to: determine that an aggregation level AL is L within duration T, where L is a positive integer; or determine that an AL is L, and send signaling to the terminal device, where the signaling is used to indicate that an AL of the first channel resource is L, and L is a positive integer.

In this embodiment of the present invention, optionally, that the processing unit 40 determines a first channel resource, comprises:

determining M candidate channel resources, where an AL of each of the M candidate channel resources is L, and M is a positive integer; and selecting a candidate channel resource from the M candidate channel resources as the first channel resource.

In this embodiment of the present invention, optionally, that the processing unit 40 selects a candidate channel resource from the M candidate channel resources as the first channel resource, comprises:

selecting, according to an identifier of the terminal device, the candidate channel resource from the M candidate channel resources as the first channel resource.

In this embodiment of the present invention, optionally, if $N_T$ is equal to 2, and L is equal to 1 or 2, M is equal to 3;

if $N_T$ is equal to 2, and L is equal to 4 or 8, M is equal to 1;

if $N_T$ is equal to 4, 6, 7, 12, or 14, and L is equal to 1 or 2, M is equal to 1 or 2; and if $N_T$ is equal to 4, 6, 7, 12, or 14, and L is equal to 4 or 8, M is equal to 1.

In this embodiment of the present invention, optionally, the DCI includes information used to indicate a transmission resource.

The sending unit 41 is further configured to perform data transmission with the terminal device on the transmission resource.

In this embodiment of the present invention, optionally, the transmission resource is unavailable to carry DCI of another terminal device.

In this embodiment of the present invention, optionally, the $i^{th}$ time unit includes at least one data symbol, and the first channel resource is located at a data symbol in the $i^{th}$ time unit in the time domain.

In this embodiment of the present invention, optionally, when the $i^{th}$ time unit includes a PDCCH symbol, the first channel resource is located at the PDCCH symbol in the $i^{th}$ time unit in the time domain; or when the $i^{th}$ time unit does not include a PDCCH symbol, and includes at least one data symbol, the first channel resource is located at a data symbol in the $i^{th}$ time unit in the time domain.

In this embodiment of the present invention, optionally, when the first channel resource is located at the data symbol in the $i^{th}$ time unit in the time domain, the first channel resource includes X RUs, and any one of the X RUs occupies one symbol in the time domain, and occupies $N_{sc}^{RB}$ subcarriers in a frequency domain, where X is a positive integer.

In this embodiment of the present invention, optionally, if Y is greater than or equal to X, the first channel resource is located at the $1^{st}$ data symbol in the $i^{th}$ time unit in the time domain, and occupies X RUs in a frequency domain, where Y is a quantity of RUs occupied by an available bandwidth in the frequency domain;

if Y is less than X, the first channel resource is located at the first N data symbols in the $i^{th}$ time unit in the time domain; and for each of the N data symbols, the first channel resource occupies $$\frac{X}{N}$$

RUs in the frequency domain, where N is less than or equal to a total quantity of data symbols included in the $i^{th}$ time unit; and if Y is less than X, the first channel resource is located at the first N data symbols in the $i^{th}$ time unit in the time domain; and for the first N-1 data symbols of the N data symbols, the first channel resource occupies W RUs in the frequency domain, and for the $N^{th}$ data symbol of the N data symbols, the first channel resource occupies X−W*(N-1) RUs in the frequency domain, where N is less than or equal to a total quantity of data symbols included in the $i^{th}$ time unit, W is less than or equal to Y, and X−W*(N-1) is less than or equal to Y.

In this embodiment of the present invention, optionally, when the first channel resource is located at the data symbol in the $i^{th}$ time unit in the time domain, the first channel resource is a localized channel resource or a distributed channel resource.

In this embodiment of the present invention, optionally, the DCI includes information used to indicate a transmission resource;
if the first channel resource is the localized channel resource, the transmission resource occupies at least one localized enhanced resource block group LERBG in the frequency domain; and
if the first channel resource is the distributed channel resource, the transmission resource occupies at least one distributed enhanced resource block group DERBG in the frequency domain.

In this embodiment of the present invention, optionally, if $N_T=2$, and the $i^{th}$ time unit is the first time unit, the first channel resource is a PDCCH in a first control region, and the first control region is located at the first $N_{sym1}$ symbols in the $1^{st}$ slot; and
if $N_T=2$, and the $i^{th}$ time unit is the second time unit, the first channel resource is a PDCCH in a second control region, and the second control region is located at the first $N_{sym1}$ symbols in the $2^{nd}$ slot.

$N_{sym1}$ is 1, 2, 3, or 4, $N_{sym2}$ is a positive integer, and a quantity of frequency domain resources occupied by the second control region is less than or equal to a quantity of frequency domain resources occupied by the first control region.

In this embodiment of the present invention, further, the sending unit 41 is further configured to send, to the terminal device, signaling indicating a value of $N_{sym2}$.

The signaling is a control format indicator CFI carried on a physical control format indicator channel PCFICH in the $1^{st}$ slot, or a CFI carried on a PCFICH in the $2^{nd}$ slot, or DCI carried on a PDCCH in the $1^{st}$ slot, or higher layer signaling.

Figure 4B:
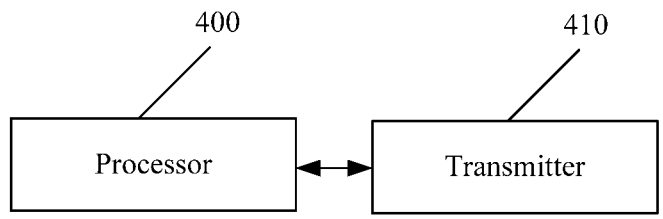
FIG. 4B is another schematic diagram of a base station according to an embodiment of the present invention.

Referring to FIG. 4B, an embodiment of the present invention provides a base station. The base station includes a processor 400 and a transmitter 410.

The processor 400 is configured to determine a first channel resource. The first channel resource is located in the $i^{th}$ time unit of a subframe in a time domain, the subframe includes $N_T$ time units, $N_T$ is an integer greater than or equal to 2, and i is a positive integer less than or equal to $N_T$.

The transmitter 410 is configured to send downlink control information DCI to a terminal device on the first channel resource.

It should be noted that, the processor 400 is further configured to perform another operation that is performed by the processing unit 40, and the transmitter 410 is further configured to perform another operation that is performed by the sending unit 41.

It should be noted that, the base station described in FIG. 4A and FIG. 4B can execute all steps in Embodiment 1. That is, even though steps that can be executed by the base station described in FIG. 4A and FIG. 4B have no specific or extended operations in Embodiment 3, if these steps have specific or extended operations in Embodiment 1, the specific or extended operations of these steps are also applicable to the base station described in FIG. 4A and FIG. 4B. The base station described in FIG. 4A and FIG. 4B may perform a specific or extended operation for a corresponding step according to the specific and extended operations in Embodiment 1.

Similarly, all static restriction descriptions in Embodiment 1 are also applicable to the base station described in FIG. 4A and FIG. 4B.

The first channel resource that is determined by the base station provided in FIG. 4A and FIG. 4B is located in the $i^{th}$ time unit of the subframe in the time domain, where i is a positive integer less than or equal to $N_T$. That is, there is a first channel resource in each time unit of the subframe. Therefore, when data needs to be transmitted in any time unit, the base station provided in FIG. 4A and FIG. 4B can transmit the data immediately, instead of waiting until a next subframe. Therefore, the base station provided in FIG. 4A and FIG. 4B reduces a scheduling delay.

Embodiment 4

Figure 5A:
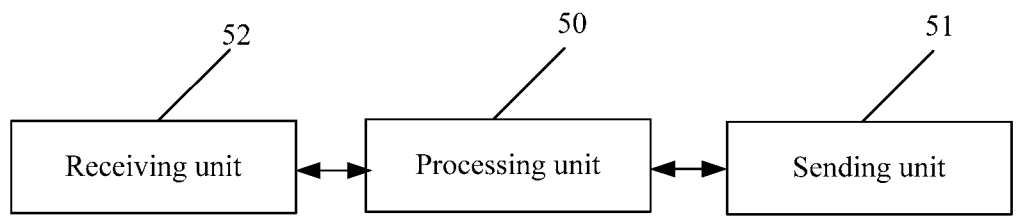
FIG. 5A is a schematic diagram of a terminal device according to an embodiment of the present invention.

Referring to FIG. 5A, in this embodiment of the present invention, a terminal device is provided. The terminal device includes a processing unit 50 and a sending unit 51.

The processing unit 50 is configured to detect a first channel resource, where the first channel resource is located in the $i^{th}$ time unit of a subframe in a time domain, the subframe includes $N_T$ time units, $N_T$ is an integer greater than or equal to 2, and i is a positive integer less than or equal to $N_T$.

The sending unit 51 is configured to decode downlink control information DCI that is sent by a base station, where the DCI is carried on the first channel resource.

In this embodiment of the present invention, optionally, $N_T$ is at least one of 2, 4, 6, 7, 12, or 14.

In this embodiment of the present invention, optionally, when $N_T=2$, two time units included in the subframe are a first time unit and a second time unit, the first time unit is located in the $1^{st}$ slot of the subframe, and the second time unit is located in the $2^{nd}$ slot of the subframe; or
when $N_T=4$, four time units included in the subframe are a first time unit, a second time unit, a third time unit, and a fourth time unit, the first time unit is located in a first symbol set {#0, #1, #2, #3}, the second time unit is located in a second symbol set {#4, #5, #6}, the third time unit is located in a third symbol set {#7, #8, #9, #10}, and the fourth time unit is located in a fourth symbol set {#11, #12, #13}.

In this embodiment of the present invention, further, the processing unit 50 is further configured to determine that an aggregation level AL is L within duration T, where L is a positive integer; or
the terminal device further includes a receiving unit 52, configured to receive signaling sent by the base station, where
the processing unit 50 is further configured to determine, according to the signaling received by the receiving unit, that an AL is L, where the signaling is used to indicate that an AL of the first channel resource is L, and L is a positive integer.

In this embodiment of the present invention, optionally, that the processing unit 50 detects a first channel resource, comprises:

determining M candidate channel resources, where an AL of each of the M candidate channel resources is L, and M is a positive integer; and finding a candidate channel resource from the M candidate channel resources as the first channel resource.

In this embodiment of the present invention, optionally, that the processing unit 50 finds a candidate channel resource from the M candidate channel resources as the first channel resource, comprises:

finding, according to an identifier of the terminal device, the candidate channel resource from the M candidate channel resources as the first channel resource.

In this embodiment of the present invention, optionally, if $N_T$ is equal to 2, and L is equal to 1 or 2, M is equal to 3;

if $N_T$ is equal to 2, and L is equal to 4 or 8, M is equal to 1;

if $N_T$ is equal to 4, 6, 7, 12, or 14, and L is equal to 1 or 2, M is equal to 1 or 2; and if $N_T$ is equal to 4, 6, 7, 12, or 14, and L is equal to 4 or 8, M is equal to 1.

In this embodiment of the present invention, optionally, the DCI includes information used to indicate a transmission resource.

The sending unit 51 is further configured to perform data transmission with the base station on the transmission resource.

In this embodiment of the present invention, optionally, the transmission resource is unavailable to carry DCI of another terminal device.

In this embodiment of the present invention, optionally, the $i^{th}$ time unit includes at least one data symbol, and the first channel resource is located at a data symbol in the $i^{th}$ time unit in the time domain.

In this embodiment of the present invention, optionally, when the $i^{th}$ time unit includes a PDCCH symbol, the first channel resource is located at the PDCCH symbol in the $i^{th}$ time unit in the time domain; or when the $i^{th}$ time unit does not include a PDCCH symbol, and includes at least one data symbol, the first channel resource is located at a data symbol in the $i^{th}$ time unit in the time domain.

In this embodiment of the present invention, optionally, when the first channel resource is located at the data symbol in the $i^{th}$ time unit in the time domain, the first channel resource includes X RUs, and any one of the X RUs occupies one symbol in the time domain, and occupies $N_{sc}^{RB}$ subcarriers in a frequency domain, where X is a positive integer.

In this embodiment of the present invention, optionally, if Y is greater than or equal to X, the first channel resource is located at the $1^{st}$ data symbol in the $i^{th}$ time unit in the time domain, and occupies X RUs in a frequency domain, where Y is a quantity of RUs occupied by an available bandwidth in the frequency domain;

if Y is less than X, the first channel resource is located at the first N data symbols in the $i^{th}$ time unit in the time domain; and for each of the N data symbols, the first channel resource occupies $$\frac{X}{N}$$

RUs in the frequency domain, where N is less than or equal to a total quantity of data symbols included in the $i^{th}$ time unit; and if Y is less than X, the first channel resource is located at the first N data symbols in the $i^{th}$ time unit in the time domain; and for the first N-1 data symbols of the N data symbols, the first channel resource occupies W RUs in the frequency domain, and for the $N^{th}$ data symbol of the N data symbols, the first channel resource occupies X−W*(N-1) RUs in the frequency domain, where N is less than or equal to a total quantity of data symbols included in the $i^{th}$ time unit, W is less than or equal to Y, and X−W*(N-1) is less than or equal to Y.

In this embodiment of the present invention, optionally, when the first channel resource is located at the data symbol in the $i^{th}$ time unit in the time domain, the first channel resource is a localized channel resource or a distributed channel resource.

In this embodiment of the present invention, optionally, the DCI includes information used to indicate a transmission resource;

if the first channel resource is the localized channel resource, the transmission resource occupies at least one localized enhanced resource block group LERBG in the frequency domain; and if the first channel resource is the distributed channel resource, the transmission resource occupies at least one distributed enhanced resource block group DERBG in the frequency domain.

In this embodiment of the present invention, optionally, if $N_T$=2, and the $i^{th}$ time unit is the first time unit, the first channel resource is a PDCCH in a first control region, and the first control region is located at the first $N_{sym1}$ symbols in the $1^{st}$ slot; and if $N_T$=2, and the $i^{th}$ time unit is the second time unit, the first channel resource is a PDCCH in a second control region, and the second control region is located at the first $N_{sym2}$ symbols in the $2^{nd}$ slot.

$N_{sym1}$ is 1, 2, 3, or 4, $N_{sym2}$ is a positive integer, and a quantity of frequency domain resources occupied by the second control region is less than or equal to a quantity of frequency domain resources occupied by the first control region.

In this embodiment of the present invention, further, the terminal device further includes a receiving unit 52, configured to receive signaling that is used to indicate a value of $N_{sym2}$ and that is sent by the base station.

The signaling is a control format indicator CFI carried on a physical control format indicator channel PCFICH in the $1^{st}$ slot, or a CFI carried on a PCFICH in the $2^{nd}$ slot, or DCI carried on a PDCCH in the $1^{st}$ slot, or higher layer signaling.

Figure 5B:
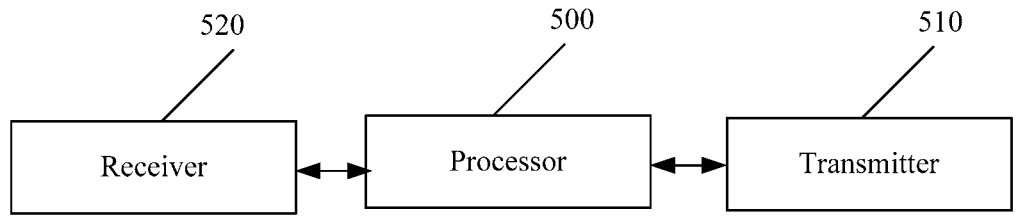
FIG. 5B is another schematic diagram of a terminal device according to an embodiment of the present invention.

Referring to FIG. 5B, an embodiment of the present invention provides a schematic diagram of a terminal device. The terminal device includes a processor 500 and a transmitter 510.

The processor 500 is configured to detect a first channel resource, where the first channel resource is located in the $i^{th}$ time unit of a subframe in a time domain, the subframe includes $N_T$ time units, $N_T$ is an integer greater than or equal to 2, and i is a positive integer less than or equal to $N_T$.

The transmitter 510 is configured to decode downlink control information DCI that is sent by a base station, where the DCI is carried on the first channel resource.

It should be noted that, the processor 500 is further configured to perform another operation that is performed by the processing unit 50, and the transmitter 510 is further configured to perform another operation that is performed by the sending unit 51. The terminal device further includes a receiver 520, configured to perform an operation that is performed by the receiving unit 52.

It should be noted that, the terminal device described in FIG. 5A and FIG. 5B can execute all steps in Embodiment 2. That is, even though steps that can be executed by the terminal device described in FIG. 5A and FIG. 5B have no specific or extended operations in Embodiment 4, if these steps have specific or extended operations in Embodiment 2, the specific or extended operations of these steps are also applicable to the terminal device described in FIG. 5A and FIG. 5B. The terminal device described in FIG. 5A and FIG. 5B may perform a specific or extended operation for a corresponding step according to the specific and extended operations in Embodiment 2.

Similarly, all static restriction descriptions in Embodiment 2 are also applicable to the terminal device described in FIG. 5A and FIG. 5B.

The first channel resource that is detected by the terminal device provided in FIG. 5A and FIG. 5B is located in the $i^{th}$ time unit of the subframe in the time domain, where i is a positive integer less than or equal to $N_T$. That is, there is a first channel resource in each time unit of the subframe. Therefore, when data needs to be transmitted in any time unit, the data can be transmitted immediately, instead of waiting until a next subframe. That is, when needing to receive data in any time unit, the terminal device provided in FIG. 5A and FIG. 5B can receive the data immediately, instead of waiting until a next subframe. Therefore, the terminal device provided in FIG. 5A and FIG. 5B reduces a scheduling delay.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations of the embodiments of the present invention provided that they fall within the scope of protection defined by the following claims and their equivalent technologies.

What is claimed is:

1. A method, comprising:
   detecting, by a terminal device, downlink control information (DCI) on a first channel resource, wherein the first channel resource is located in an $i^{th}$ time unit of a subframe and is one of one or more candidate physical downlink control channel resources in the $i^{th}$ time unit, the subframe comprises $N_T$ time units, each of the $N_T$ time units comprising at least one candidate physical downlink control channel resource, wherein $N_T$ is an integer greater than or equal to 2, and i is a positive integer less than or equal to $N_T$; and
   decoding, by the terminal device, the DCI;
   wherein the first channel resource consists of X resource units, and each of the X resource units of the first channel resource occupies 12 resource elements in one symbol in a time domain and 12 subcarriers in a frequency domain, wherein X is a positive integer;
   when $N_T$=2, two time units in the subframe are a first time unit and a second time unit, wherein the first time unit is located in a 1st slot of the subframe, and the second time unit is located in a $2^{nd}$ slot of the subframe;
   if the $i^{th}$ time unit is the first time unit, the first channel resource is a physical downlink control channel in a first control region located at $N_{sym1}$ symbols in the $1^{st}$ slot; and
   if the $i^{th}$ time unit is the second time unit, the first channel resource is a physical downlink control channel in a second control region, and the second control region is located at first $N_{sym2}$ symbols in the $2^{nd}$ slot, wherein $N_{sym1}$ is any one of 1, 2, or 3, $N_{sym2}$ is any one of 1, 2 or 3.

2. The method according to claim 1, wherein
   the $i^{th}$ time unit comprises at least one data symbol, and the first channel resource is located at a data symbol in the $i^{th}$ time unit in the time domain.

3. The method according to claim 1, wherein
   the first channel resource is located at a $1^{st}$ symbol in the $i^{th}$ time units in the time domain, and occupies the X resource units in the frequency domain;
   the first channel resource is located at first N symbols in the $i^{th}$ time unit in the time domain; and for each of the first N symbols, the first channel resource occupies $$\frac{X}{N}$$

resource units in the frequency domain, wherein N is less than or equal to a total quantity of data symbols comprised in the $i^{th}$ time unit; or the first channel resource is located at the first N symbols in the $i^{th}$ time unit in the time domain; and for first N-1 symbols of the first N symbols, the first channel resource occupies W resource units in the frequency domain, and for an $N^{th}$ symbol of the first N symbols, the first channel resource occupies X−W*(N−1) resource units in the frequency domain, wherein N is less than or equal to the total quantity of symbols comprised in the $i^{th}$ time unit, W is less than or equal to Y, and X−W*(N−1) is less than or equal to Y, wherein Y is a quantity of resource units occupied by an available bandwidth in the frequency domain.

4. The method according to claim 1, wherein
the first channel resource is located in a first symbol in the $i^{th}$ time unit, the first channel resource occupies six resource units in the frequency domain, and X is equal to 6; or
the first channel resource is located in first two symbols in the $i^{th}$ time unit, for each of first data symbols, the first channel resource occupies six resource units in the frequency domain, and X is equal to 12.

5. The method according to claim 1, wherein
a quantity of frequency domain resources occupied by the second control region is less than or equal to a quantity of frequency domain resources occupied by the first control region.

6. The method according to claim 5, wherein before the detecting, by a terminal device, the DCI on the first channel resource, the method further comprises:
receiving, by the terminal device, higher layer signaling indicating a value of $N_{sym2}$.

7. The method according to claim 1, wherein before the detecting, by the terminal device, the first channel resource, the method further comprises:
receiving, by the terminal device, signaling from a base station, and determining, according to the signaling, that an aggregation level (AL) is L, wherein the signaling indicates L, and L is a positive integer; and, wherein
detecting, by the terminal device, the DCI on the first channel resource comprises:
determining, by the terminal device, M candidate channel resources, wherein an AL of each of the M candidate channel resources is L, and M is a positive integer and depends on $N_T$;
taking, by the terminal device, a candidate channel resource from the M candidate channel resources as the first channel resource; and
detecting, by the terminal device, the DCI on the candidate channel resource.

8. The method according to claim 1, wherein $N_T$ is at least one of 2, 4, 6, 7, 12, or 14.

9. The method according to claim 1, wherein the DCI includes at least one of uplink scheduling information, downlink scheduling information, or information for requesting aperiodic CSI reporting, wherein
the uplink scheduling information includes configuration information, wherein the configuration information indicates a time domain resource, a frequency domain resource, or a code domain resource that is occupied by an uplink reference signal;
the downlink scheduling information includes configuration information, where the configuration information indicates a type of a downlink reference signal, or a time domain resource, a frequency domain resource, or a code domain resource that is occupied by the downlink reference signal.

10. An apparatus, comprising:
a storage medium including executable instructions; and
a processor;
wherein the executable instructions, when executed by the processor, cause the apparatus to:
detect downlink control information (DCI) on a first channel resource, wherein the first channel resource is located in an $i^{th}$ time unit of a subframe and is one of one or more candidate physical downlink control channel resources in the $i^{th}$ time unit, the subframe comprises $N_T$ time units, each of the $N_T$ time units comprising at least one candidate physical downlink control channel resource, wherein $N_T$ is an integer greater than or equal to 2, and i is a positive integer less than or equal to $N_T$; and
decode the DCI;
wherein the first channel resource consists of X resource units, and each of the X RUs of the first channel resource occupies 12 resource elements in one symbol in a time domain and 12 subcarriers in a frequency domain, wherein X is a positive integer;
when $N_T$=2, two time units in the subframe are a first time unit and a second time unit, wherein the first time unit is located in a $1^{st}$ slot of the subframe, and the second time unit is located in a $2^{nd}$ slot of the subframe;
if the $i^{th}$ time unit is the first time unit, the first channel resource is a physical downlink control channel in a first control region located at $N_{sym1}$ symbols in the $1^{st}$ slot;
if the $i^{th}$ time unit is the second time unit, the first channel resource is a physical downlink control channel in a second control region, and the second control region is located at a first $N_{sym2}$ symbols in the $2^{nd}$ slot, wherein $N_{sym1}$ is any one of 1, 2, or 3, $N_{sym2}$ is any one of 1, 2 or 3.

11. The apparatus according to claim 10, wherein
the $i^{th}$ time unit comprises at least one data symbol, and the first channel resource is located at a data symbol in the $i^{th}$ time unit in the time domain.

12. The apparatus according to claim 10, wherein
the first channel resource is located at a 1st symbol in the $i^{th}$ time unit in the time domain, and occupies the X resource units in the frequency domain; or
the first channel resource is located at first N symbols in the $i^{th}$ time unit in the time domain; and for each of the first N symbols, the first channel resource occupies $$\frac{X}{N}$$

resource units in the frequency domain, wherein N is less than or equal to a total quantity of data symbols comprised in the $i^{th}$ time unit; or
the first channel resource is located at the first N symbols in the $i^{th}$ time unit in the time domain; and for first N-1 symbols of the first N symbols, the first channel resource occupies W resource units in the frequency domain, and for an $N^{th}$ symbol of the first N symbols, the first channel resource occupies X−W*(N−1) resource units in the frequency domain, wherein N is less than or equal to the total quantity of symbols comprised in the $i^{th}$ time unit, W is less than or equal to Y, and X−W*(N−1) is less than or equal to Y, wherein Y is a quantity of resource units occupied by an available bandwidth in the frequency domain.

13. The apparatus according to claim 10, wherein
the first channel resource is located in a $1^{st}$ symbol in the $i^{th}$ time unit, the first channel resource occupies six resource units in the frequency domain, wherein X is equal to 6; or
the first channel resource is located in first two symbols in the $i^{th}$ time unit, for each of the first two symbols, the first channel resource occupies six resource units in the frequency domain, wherein X is equal to 12.

14. The apparatus according to claim 10, wherein
a quantity of frequency domain resources occupied by the second control region is less than or equal to a quantity of frequency domain resources occupied by the first control region.

15. The apparatus according to claim 14, wherein the executable instructions, when executed by the processor, further cause the apparatus to:
receive higher layer signaling that is used to indicate a value of $N_{sym2}$.

16. The apparatus according to claim 10, wherein the executable instructions, when executed by the processor, further cause the apparatus to:
receive signaling indicating L, and determine, according to the signaling, that an aggregation level (AL) of the first channel resource is L, wherein L is a positive integer;
wherein the executable instructions, when executed by the processor, cause the apparatus to detect the DCI on the first channel resource as follows:
determining M candidate channel resources, wherein an AL of each of the M candidate channel resources is L, and M is a positive integer and depends on $N_T$;
taking a candidate channel resource from the M candidate channel resources as the first channel resource; and detect the DCI on the candidate channel resource.

17. The apparatus according to claim 10, wherein $N_T$ is at least one of 2, 4, 6, 7, 12, or 14.

18. The apparatus according to claim 10, wherein the DCI includes at least one of uplink scheduling information, downlink scheduling information, or information for requesting aperiodic channel status information (CSI) reporting, wherein
the uplink scheduling information includes configuration information, wherein the configuration information indicates a time domain resource, a frequency domain resource, or a code domain resource that is occupied by an uplink reference signal;
the downlink scheduling information includes configuration information, wherein the configuration information indicates a type of a downlink reference signal, or a time domain resource, a frequency domain resource, or a code domain resource that is occupied by the downlink reference signal.

19. A non-transitory computer-readable storage medium comprising instructions which, when executed by a terminal device, cause the terminal device to carry out the steps of:
detecting downlink control information (DCI) on a first channel resource, wherein the first channel resource is located in an $i^{th}$ time unit of a subframe and is one of one or more candidate physical downlink control channel resources in the $i^{th}$ time unit, the subframe comprises $N_T$ time units, each of the $N_T$ time units comprises at least one candidate physical downlink control channel resource, $N_T$ is an integer greater than or equal to 2, and i is a positive integer less than or equal to $N_T$; and
decoding, by the terminal device, the DCI;
wherein the first channel resource consists of X resource units, and each of the X resource units of the first channel resource occupies 12 resource elements in one symbol in a time domain and 12 subcarriers in a frequency domain, wherein X is a positive integer;
when $N_T=2$, two time units in the subframe are a first time unit and a second time unit, wherein the first time unit is located in a $1^{st}$ slot of the subframe, and the second time unit is located in a $2^{nd}$ slot of the subframe;
if the $i^{th}$ time unit is the first time unit, the first channel resource is a physical downlink control channel in a first control region located at $N_{sym1}$ symbols in the $1^{st}$ slot; and
if the $i^{th}$ time unit is the second time unit, the first channel resource is a physical downlink control channel in a second control region, and the second control region is located at a first $N_{sym2}$ symbols in the $2^{nd}$ slot, wherein $N_{sym1}$ is any one of 1, 2, or 3, $N_{sym2}$ is any one of 1, 2 or 3.

20. The non-transitory computer-readable storage medium according to claim 19, wherein
the first channel resource is located at a $1^{st}$ symbol in the $i^{th}$ time unit in the time domain, and occupies the X resource units in the frequency domain; or
the first channel resource is located at first N symbols in the $i^{th}$ time unit in the time domain; and for each of the first N symbols, the first channel resource occupies $$\frac{X}{N}$$

resource units in the frequency domain, wherein N is less than or equal to a total quantity of data symbols comprised in the $i^{th}$ time unit; or
the first channel resource is located at the first N symbols in the $i^{th}$ time unit in the time domain; and for first N−1 symbols of the first N symbols, the first channel resource occupies W resource units in the frequency domain, and for an $N^{th}$ symbol of the first N symbols, the first channel resource occupies X−W*(N−1) resource units in the frequency domain, wherein N is less than or equal to the total quantity of symbols comprised in the $i^{th}$ time unit, W is less than or equal to Y, and X−W*(N−1) is less than or equal to Y, wherein Y is a quantity of resource units occupied by an available bandwidth in the frequency domain.

21. The non-transitory computer-readable storage medium according to claim 19, wherein
the first channel resource is located in a first symbol in the $i^{th}$ time unit, the first channel resource occupies six resource units in the frequency domain, wherein X is equal to 6; or
the first channel resource is located in first two symbols in the $i^{th}$ time unit, for each of first data symbols, the first channel resource occupies six resource units in the frequency domain, wherein X is equal to 12.

22. The non-transitory computer-readable storage medium according to claim 19, wherein
 a quantity of frequency domain resources occupied by the second control region is less than or equal to a quantity of frequency domain resources occupied by the first control region.

\* \* \* \* \*